(12) United States Patent
Miyake et al.

(10) Patent No.: US 11,370,681 B2
(45) Date of Patent: Jun. 28, 2022

(54) WATER TREATMENT METHOD AND WATER TREATMENT DEVICE

(71) Applicant: ORGANO CORPORATION, Tokyo (JP)

(72) Inventors: Masaki Miyake, Tokyo (JP); Yoshiaki Hasebe, Tokyo (JP)

(73) Assignee: ORGANO CORPORATION, Tokyo (JP)

( * ) Notice: Subject to any disclaimer, the term of this patent is extended or adjusted under 35 U.S.C. 154(b) by 0 days.

(21) Appl. No.: 17/253,512

(22) PCT Filed: Jun. 20, 2019

(86) PCT No.: PCT/JP2019/024421
§ 371 (c)(1),
(2) Date: Dec. 17, 2020

(87) PCT Pub. No.: WO2019/244964
PCT Pub. Date: Dec. 26, 2019

(65) Prior Publication Data
US 2021/0261449 A1    Aug. 26, 2021

(30) Foreign Application Priority Data

Jun. 22, 2018 (JP) .............................. JP2018-118619
Apr. 19, 2019 (JP) .............................. JP2019-080199
Apr. 19, 2019 (JP) .............................. JP2019-080200

(51) Int. Cl.
*C02F 3/30* (2006.01)
*C02F 101/16* (2006.01)

(52) U.S. Cl.
CPC .............. *C02F 3/303* (2013.01); *C02F 3/305* (2013.01); *C02F 2101/16* (2013.01);
(Continued)

(58) Field of Classification Search
CPC ...... C02F 3/303; C02F 3/305; C02F 2101/16; C02F 2209/06; C02F 2209/14; C02F 2209/40; C02F 2305/00; C02F 2305/06
(Continued)

(56) References Cited

U.S. PATENT DOCUMENTS 5,403,488 A * 4/1995 Volsch .................... C02F 3/006
                                                    210/614
2011/0084022 A1* 4/2011 Lee ......................... C02F 3/302
                                                    210/605

FOREIGN PATENT DOCUMENTS

CN     105776540 A    7/2016
JP     8-192185 A     7/1996
(Continued)

OTHER PUBLICATIONS

Machine-generated translation of JP 2012-232262, dated Dec. 16, 2021.*

(Continued)

*Primary Examiner* — Fred Prince
(74) *Attorney, Agent, or Firm* — Greenblum & Bernstein, P.L.C.

(57) ABSTRACT

Provided are a water treatment method and a water treatment device wherein in a biological treatment of ammonium nitrogen-containing water to be treated, the water to be treated can be treated stably at a high treatment speed even when the nitrogen concentration of the water to be treated is high. This water treatment device biologically treats ammonium nitrogen-containing water to be treated. The water treatment device (water treatment method) is provided with: a nitrification device (nitrification step) for oxidizing ammonium nitrogen to nitrite or nitrate nitrogen using nitrifying bacteria including autotrophic ammonia-oxidizing bacteria and nitrite-oxidizing bacteria contained in microbial activated sludge; and a nitrification rate control means which (Continued)

maintains a molybdenum compound in the nitrification device in such a manner as to control the molybdenum concentration of the water to be treated to 0.025 mg Mo/gN or more, and controls the nitrification rate for the sludge to 0.11 [kgN/(kgVSS·day)].

17 Claims, 17 Drawing Sheets

(52) U.S. Cl.
CPC ...... *C02F 2209/06* (2013.01); *C02F 2209/14* (2013.01); *C02F 2209/40* (2013.01); *C02F 2305/00* (2013.01); *C02F 2305/06* (2013.01)

(58) Field of Classification Search
USPC ....... 210/614, 615, 616, 617, 630, 903, 252, 210/259
See application file for complete search history.

(56) References Cited

FOREIGN PATENT DOCUMENTS

| | | | |
|---|---|---|---|
| JP | 2004-74111 | A | 3/2004 |
| JP | 2006-272287 | A | 10/2006 |
| JP | 2011-56383 | A | 3/2011 |
| JP | 2011-139982 | A | 7/2011 |
| JP | 2011-212635 | A | 10/2011 |
| JP | 2012-232262 | A | 11/2012 |
| JP | 2015-208708 | A | 11/2015 |
| JP | 2016-13502 | A | 1/2016 |
| JP | 2017-164739 | A | 9/2017 |
| JP | 2017-176967 | A | 10/2017 |
| JP | 6535125 | B1 | 6/2019 |

OTHER PUBLICATIONS

Machine-generated translation of JP 2015-208708, dated Dec. 17, 2021.*
Office Action issued thereof in Indian Patent Application No. 202017056251 dated Mar. 15, 2021, along with English Translation thereof.
Kraft, B. et al., "Microbial nitrate respiration—Genes, enzymes and environmental distribution", Journal of Biotechnology, 2011, pp. 104-117.
Finstein, M.S. et al., "Molybdenum as a Micronutrient for Nitrobacter", Journal of Bacteriology, 1965, vol. 89, No. 1 pp. 123-128.
Bothe, H. et al., "Molecular analysis of ammonia oxidation and denitrification in natural environments", FEMS Microbiology Reviews 24 (2000), pp. 673-690.
Araki, N. et al., "Direct Cell Counting and Observation of Spacial Distribution of Nitrifiers in Aerobic Biofilms by FISH (fluorescent in situ hybridization)", 1999.
International Search Report issued in International Patent Application No. PCT/JP2019/024421, dated Aug. 20, 2019, along with an English translation thereof.
Decision of Refusal (Office Action) in Japan Patent Appl. No. 2018-118619, dated Feb. 1, 2019, along with an English translation thereof.
Notice of Reasons for Refusal (Office Action) in Japan Patent Appl. No. 2018-118619, dated Aug. 2, 2018, along with an English translation thereof.
Notice of Reasons for Refusal (Office Action) in Japan Patent Appl. No. 2018-118619, dated Oct. 30, 2018, along with an English translation thereof.
Notice of Reasons for Refusal (Office Action) in Japan Patent Appl. No. 2019-080199, dated Aug. 9, 2019, along with an English translation thereof.
Notice of Reasons for Refusal (Office Action) in Japan Patent Appl. No. 2019-080200, dated Aug. 9, 2019, along with an English translation thereof.
Decision of Refusal (Office Action) in Japan Patent Appl. No. 2019-080200, dated Jan. 6, 2020, along with an English translation thereof.
Notice of Reasons for Refusal (Office Action) in Japan Patent Appl. No. 2019-080200, dated Jun. 11, 2020, along with an English translation thereof.
Notification Concerning Transmittal of International Preliminary Report on Patentability issued in International Patent Application No. PCT/JP2019/024421, dated Dec. 30, 2020, along with an English translation thereof.
Written Opinion of the International Searching Authority issued in International Patent Application No. PCT/JP2019/024421, dated Aug. 20, 2019, along with an English translation thereof.

* cited by examiner

WATER TREATMENT METHOD AND WATER TREATMENT DEVICE

CROSS REFERENCE TO RELATED APPLICATION

This application claims priority to Japanese Patent Application No. 2018-118619 filed on Jun. 22, 2018, Japanese Patent Application No. 2019-080199 filed on Apr. 19, 2019, and Japanese Patent Application No. 2019-080200 filed on Apr. 19, 2019, which are incorporated herein by reference in its entirety including the specification, claims, drawings, and abstract.

TECHNICAL FIELD

The present disclosure relates to a water treatment method and a water treatment device for biologically oxidizing and then reducing ammonium nitrogen contained in a water to be treated until nitrogen gas is obtained.

BACKGROUND

Nitrogen components contained in wastewater are one of the causes of the eutrophication of lakes, marshes and enclosed coastal seas, and therefore particularly in those cases where wastewater contains a high concentration of nitrogen components, those components must be removed in a wastewater treatment process. Generally, biological treatments that use microbial activated sludge are widely used, and for example, in the case of a water to be treated containing ammonium nitrogen, a nitrification-denitrification treatment is conducted via two steps: a nitrification step of oxidizing the ammonium nitrogen under aerobic conditions to obtain nitrite or nitrate nitrogen, and a denitrification step of reducing the nitrite or nitrate nitrogen to nitrogen gas under anoxic conditions and in the presence of a hydrogen donor. Further, in those cases where the water to be treated contains a large amount of organic matter, the water to be treated is sometimes treated using a circulating nitrification-denitrification method in which the water to be treated is supplied to the denitrification tank, and the mixed liquid containing nitrite and nitrate nitrogen produced in the nitrification tank is recirculated into the denitrification tank, with the denitrification conducted using the organic matter in the water being treated as a hydrogen donor.

Any of these treatments utilizes the nitrifying bacteria and denitrifying bacteria in the microbial activated sludge, but whereas denitrifying bacteria are heterotrophic bacteria capable of assimilating organic matter, nitrifying bacteria are autotrophic bacteria that use inorganic carbon as a carbon source, and therefore have an extremely slow growth rate compared with denitrifying bacteria. In the case of a treatment method that uses a microbial activated sludge, because the activated sludge contains a mixture of nitrifying bacteria and denitrifying bacteria, it is said that the abundance ratio in the sludge of the nitrifying bacteria, which are autotrophic bacteria with a low growth rate, is extremely small. When the nitrification-denitrification method is used in the treatment of a nitrogen-containing wastewater, the removal efficiency of the nitrogen in the wastewater is rate-limited by the activity of the nitrifying bacteria in the nitrification step. Further, nitrifying bacteria are greatly affected by water temperature, and there is a possibility that a reduction in water temperature may cause a significant deterioration in activity. Accordingly, in order to prevent deterioration in the treated water quality, the sludge nitrification rate (ammonia oxidation specific activity) in the nitrification step must be lower than that in the denitrification step. For example, in Non-Patent Document 1, it is reported that the ammonia oxidation specific activity was 0.113 mgN/(mgVSS·day) and the nitrite oxidation specific activity was 0.056 mgN/(mgVSS·day). In actual treatments, under water temperature conditions of 20° C., the volumetric loading of the nitrification tank is often set so that operations are conducted at a sludge treatment rate of about 0.05 to 0.1 kgN/(kgVSS·day).

On the other hand, in the case where a water to be treated containing a high concentration of nitrogen, such as a water to be treated having a nitrogen concentration of equal to or more than 100 mgN/L, is treated using a microbial activated sludge containing nitrifying bacteria and denitrifying bacteria, the nitrification activity in the nitrification step may sometimes decrease. If the nitrification activity decreases, then the final treated water quality also deteriorates, and therefore the sludge nitrification rate in the nitrification step must sometimes be set to a value lower than the aforementioned 0.05 to 0.1 kgN/(kgVSS·day), meaning it is sometimes difficult to maintain a high treatment rate.

CITATION LIST

Patent Literature

Patent Document 1: JP 2006-272287 A

Non-Patent Literature

Non-Patent Document 1: Araki et al., Direct cell counting and analysis of spatial distribution of nitrifies in aerobic biofilms by FISH, Journal of Japan Society on Water Environment 22(2), pp. 152 to 159

Non-Patent Document 2: Microbiology nitrate respiration—Genes, enzymes, and environmental distribution, Journal of Biotechnology, 155 (2011), pp. 104 to 117

Non-Patent Document 3: Molybdenum as a micronutrient for *Nitrobacter*, Journal of Bacteriology, 89 (1965), pp. 123 to 128

Non-Patent Document 4: Molecular analysis of ammonia oxidation and denitrification in natural environments, FEMS Microbiology Reviews, 24 (2000), pp. 673 to 690

SUMMARY

An object of the present disclosure is to provide a water treatment method and a water treatment device which, in the biological treatment of a water to be treated containing ammonium nitrogen, enable treatment to be performed stably at a high treatment rate even when the nitrogen concentration in the water to be treated is high.

The present disclosure provides a water treatment method for biologically treating a water to be treated containing ammonium nitrogen, wherein the method includes a nitrification step of oxidizing the ammonium nitrogen to obtain nitrite or nitrate nitrogen using nitrifying bacteria that include autotrophic ammonia-oxidizing bacteria and nitrite-oxidizing bacteria contained in a microbial activated sludge, and in the nitrification step, a molybdenum compound is allowed to be present in the water to be treated so as to obtain a molybdenum concentration of equal to or more than 0.025 mgMo/gN, and the sludge nitrification rate is equal to or more than 0.11 [kgN/(kgVSS·day)].

In the water treatment method described above, the molybdenum concentration in the nitrification step may be not more than 2 mgMo/L relative to the water to be treated.

In the water treatment method described above, the nitrogen concentration in the water to be treated may be equal to or more than 100 mgN/L.

The water treatment method described above may also include a denitrification step of reducing the nitrite or nitrate nitrogen produced in the nitrification step to obtain nitrogen gas using denitrifying bacteria contained in the microbial activated sludge.

In the denitrification step of the water treatment method described above, the microbial activated sludge containing the nitrifying bacteria and denitrifying bacteria may be granulated by imparting time variation to the amount added of a hydrogen donor so that the difference between the maximum concentration and the minimum concentration of the hydrogen donor in the hydraulic retention time for the treated water is equal to or more than 50 mgTOC/L.

In the water treatment method described above, the denitrification step may include at least a first denitrification step and a second denitrification step, and in the denitrification step, the hydrogen donor may be supplied at least in the first denitrification step such that the difference between the maximum concentration of the hydrogen donor in the first denitrification step and the minimum concentration of the hydrogen donor in the second denitrification step in the hydraulic retention time for the treated water in the second denitrification step is equal to or more than 50 mgTOC/L.

The present disclosure also provides a water treatment device for biologically treating a water to be treated containing ammonium nitrogen, wherein the water treatment device includes a nitrification unit which oxidizes the ammonium nitrogen to obtain nitrite or nitrate nitrogen using nitrifying bacteria that include autotrophic ammonia-oxidizing bacteria and nitrite-oxidizing bacteria contained in a microbial activated sludge, and a nitrification rate control unit which, in the nitrification unit, a molybdenum compound is allowed to be present in the water to be treated so as to obtain a molybdenum concentration of equal to or more than 0.025 mgMo/gN, and also controls the sludge nitrification rate to a value of equal to or more than 0.11 [kgN/(kgVSS·day)].

In the water treatment device described above, the nitrification rate control unit may control the molybdenum concentration in the nitrification unit to a value of not more than 2 mgMo/L relative to the water to be treated.

In the water treatment device described above, the molybdenum concentration in the water to be treated may be not more than 0.0001 mgMo/L.

In the water treatment device described above, the nitrogen concentration in the water to be treated may be equal to or more than 100 mgN/L.

The water treatment device described above may also include a denitrification unit which reduces the nitrite or nitrate nitrogen produced in the nitrification unit to obtain nitrogen gas using denitrifying bacteria contained in the microbial activated sludge.

In the water treatment device described above, the denitrification unit may also include a hydrogen donor concentration control unit which controls granulation of the microbial activated sludge containing the nitrifying bacteria and denitrifying bacteria by imparting time variation to the amount added of the hydrogen donor so that the difference between the maximum concentration and the minimum concentration of the hydrogen donor in the hydraulic retention time for the treated water is equal to or more than 50 mgTOC/L.

In the water treatment device described above, the denitrification unit may include at least a first denitrification unit and a second denitrification unit, and the hydrogen donor concentration control unit may control supply of the hydrogen donor in at least the first denitrification unit such that the difference between the maximum concentration of the hydrogen donor in the first denitrification unit and the minimum concentration of the hydrogen donor in the second denitrification unit in the hydraulic retention time for the treated water in the second denitrification unit is equal to or more than 50 mgTOC/L.

By using the present disclosure, biological treatment of a water to be treated containing ammonium nitrogen can be conducted stably at a high treatment rate even when the nitrogen concentration in the water to be treated is high.

DESCRIPTION OF EMBODIMENTS

Embodiments of the present disclosure are described below. These embodiments are merely examples of implementing the present disclosure, and the present disclosure is not limited to these embodiments.

Figure 1:
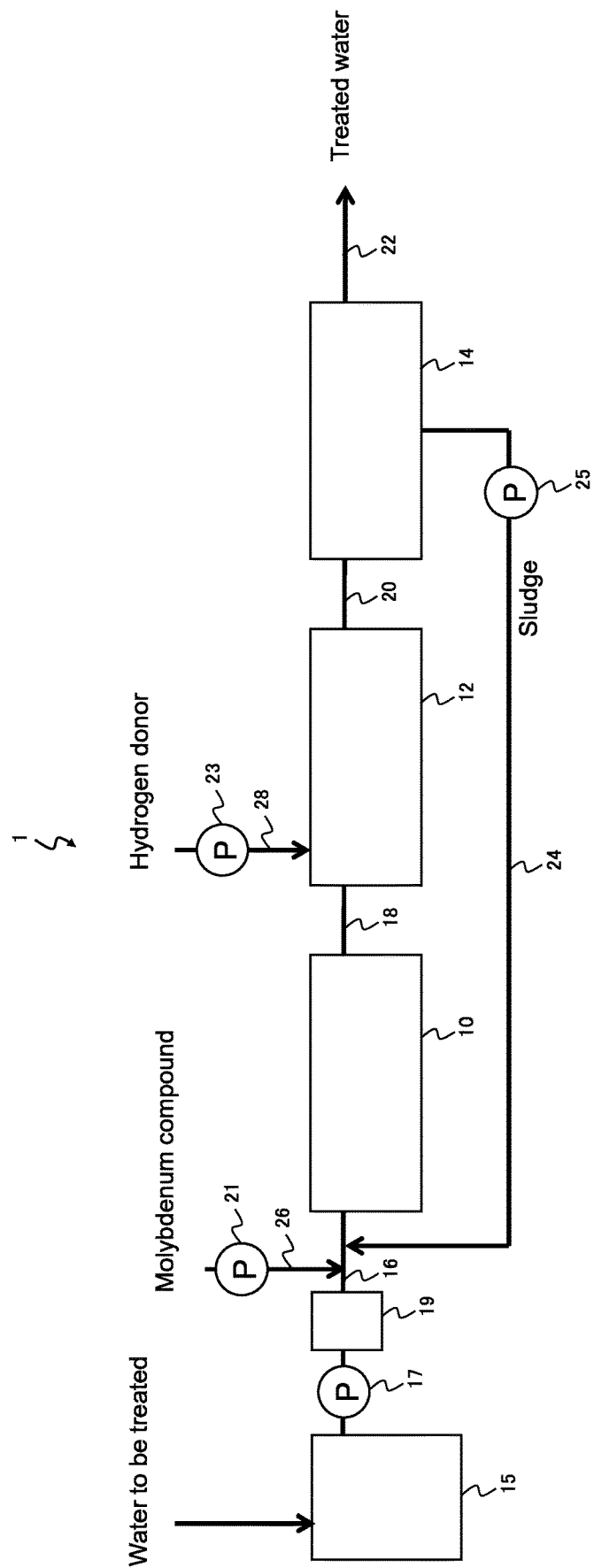
FIG. 1 is a schematic structural diagram illustrating one example of a water treatment device according to an embodiment of the present disclosure.

The outline of one example of a water treatment device according to an embodiment of the present disclosure is illustrated in FIG. 1, and the structure of that device is described below.

The water treatment device 1 is a water treatment device for biologically treating a water to be treated containing ammonium nitrogen, and includes a nitrification device 10 which functions as a nitrification unit that oxidizes the ammonium nitrogen to obtain nitrite or nitrate nitrogen using nitrifying bacteria that include autotrophic ammonia-oxidizing bacteria and nitrite-oxidizing bacteria contained in a microbial activated sludge, and a nitrification rate control unit which, in the nitrification device 10, a molybdenum compound is allowed to be present in the water to be treated so as to obtain a molybdenum concentration of equal to or more than 0.025 mgMo/gN, and also controls the sludge nitrification rate to a value of equal to or more than 0.11 [kgN/(kgVSS·day)]. The water treatment device 1 may also include a denitrification device 12 that functions as a denitrification unit which reduces the nitrite or nitrate nitrogen produced in the nitrification device 10 to obtain nitrogen gas using denitrifying bacteria contained in the microbial activated sludge.

The water treatment device 1 may also conclude, as a solid-liquid separation unit for separating the treated water from the microbial activated sludge to obtain a treated water, a solid-liquid separation device 14, and a sludge return line 24 which functions as a return unit for returning the sludge separated by the solid-liquid separation device 14 to upstream of the solid-liquid separation device 14. Further, the water treatment device 1 may also include a water to be treated balancing tank 15 for storing the water to be treated.

In the water treatment device 1 of FIG. 1, the outlet of the water to be treated balancing tank 15 and the inlet of the nitrification device 10 are connected by a line 16 via a water to be treated supply pump 17 which functions as a water to be treated supply rate adjustment unit, the outlet of the nitrification device 10 and the inlet of the denitrification device 12 are connected by a line 18, the outlet of the denitrification device 12 and the inlet of the solid-liquid separation device 14 are connected by a line 20, a line 22 is connected to the treated water outlet of the solid-liquid separation device 14, and a sludge outlet from the solid-liquid separation device 14 and the line 16 are connected by a sludge return line 24 via a sludge return pump 25. A flow rate measurement device 19 which functions as a water to be treated flow rate measurement unit for measuring the flow rate of the water to be treated is installed within the line 16 at a location downstream from the water to be treated supply pump 17, a molybdenum compound supply line 26 is connected to the line 16 via a molybdenum compound supply pump 21 which functions as a molybdenum compound supply rate adjustment unit, at a location downstream from the flow rate measurement device 19 but upstream of the connection point of the sludge return line 24, and a hydrogen donor supply line 28 is connected to the denitrification device 12 via a hydrogen donor supply pump 23 which functions as a hydrogen donor supply rate adjustment unit.

A water treatment method according to an embodiment of the present disclosure and the operation of the water treatment device 1 are described below.

A water to be treated containing ammonium nitrogen is fed from the water to be treated balancing tank 15 through the line 16 and into the nitrification device 10 by the water to be treated supply pump 17. In the nitrification device 10, the ammonium nitrogen contained in the water to be treated is oxidized to obtain nitrite or nitrate nitrogen using nitrifying bacteria that include autotrophic ammonia-oxidizing bacteria and nitrite-oxidizing bacteria contained in the microbial activated sludge (the nitrification step). Further, a molybdenum compound is supplied through the molybdenum compound supply line 26 to the water to be treated in the line 16 by the molybdenum compound supply pump 21, and the molybdenum compound is allowed to be present in the water to be treated so as to obtain a molybdenum concentration of equal to or more than 0.025 mgMo/gN (the molybdenum compound supply step). The nitrified liquid is fed through the line 18 and into the denitrification device 12.

In the denitrification device 12, a hydrogen donor is supplied through the hydrogen donor supply line 28 by the hydrogen donor supply pump 23, and the nitrite or nitrate nitrogen produced in the nitrification device 10 (in the nitrification step) is reduced to nitrogen gas by heterotrophic denitrifying bacteria contained in the microbial activated sludge (the denitrification step). The denitrified liquid is fed through the line 20 and into the solid-liquid separation device 14.

In the solid-liquid separation device 14, the treated water is separated from the microbial activated sludge in the denitrified liquid, thus obtaining the treated water (the solid-liquid separation step). The treated water obtained from the solid-liquid separation is passed through the line 22 and discharged. On the other hand, at least a portion of the sludge obtained from the solid-liquid separation is fed through the sludge return line 24 and returned to the line 16 by the sludge return pump 25, and then mixed with the water to be treated. The sludge may be returned to upstream of the solid-liquid separation device 14 (the solid-liquid separation step), and for example, may be returned to the nitrification device 10 or the denitrification device 12, or returned to the line 18 or 20. At least a portion of the sludge obtained from the solid-liquid separation may be discharged from the solid-liquid separation device 14 and expelled from the system.

The inventors of the present disclosure discovered that in a method for treating a nitrogen-containing water to be treated containing ammonium nitrogen, and particularly a nitrogen-containing water to be treated with a high nitrogen concentration of, for example, 100 mgN/L or greater, using a microbial activated sludge containing nitrifying bacteria including autotrophic ammonia-oxidizing bacteria and nitrite-oxidizing bacteria, in those cases where the metabolic activity of the microbes deteriorates and the treatment speed decreases, by a molybdenum compound being allowed to be present in the water to be treated so as to obtain a molybdenum concentration of equal to or more than 0.025 mgMo/gN, and also controlling the reaction so as to achieve a sludge nitrification rate of equal to or more than 0.11 [kgN/(kgVSS·day)], the metabolic activity of the nitrifying bacteria recovered dramatically, and then improved further, enabling a high treatment rate to be obtained in a stable manner. Further, the inventors of the present disclosure discovered that in a method for treating a nitrogen-containing water to be treated containing ammonium nitrogen, and particularly a nitrogen-containing water to be treated with a high nitrogen concentration of, for example, 100 mgN/L or greater, using a microbial activated sludge containing nitrifying bacteria including autotrophic ammonia-oxidizing bacteria and nitrite-oxidizing bacteria as well as heterotrophic denitrifying bacteria, in those cases where the metabolic activity of the microbes deteriorates and the treatment speed decreases, by a molybdenum compound being allowed to be present in the water to be treated so as to obtain a molybdenum concentration of equal to or more than 0.025 mgMo/gN, and also controlling the reaction so as to achieve a sludge nitrification rate of equal to or more than 0.11 [kgN/(kgVSS·day)], the metabolic activity of the nitrifying bacteria and the denitrifying bacteria recovered dramatically, and then improved further, enabling a high treatment rate to be obtained in a stable manner.

In the biological treatment of a nitrogen-containing water to be treated, and particularly a nitrogen-containing water to be treated with a high nitrogen concentration, by using a molybdenum compound to improve the activity of the nitrifying bacteria including ammonia-oxidizing bacteria and nitrite-oxidizing bacteria in the microbial activated sludge, treatment can be performed stably at a high treatment rate even when the nitrogen concentration in the water to be treated is high. Further, in the biological treatment of a nitrogen-containing water to be treated, and particularly a nitrogen-containing water to be treated with a high nitrogen concentration, by using a molybdenum compound to improve not only the activity of the denitrifying bacteria in the microbial activated sludge, but also the activity of the nitrifying bacteria including ammonia-oxidizing bacteria and nitrite-oxidizing bacteria, treatment can be performed stably at a high treatment rate even when the nitrogen concentration in the water to be treated is high.

The sludge nitrification rate may be controlled to achieve any value of equal to or more than 0.11 [kgN/(kgVSS·day)], and may be controlled to a value of not more than 0.24 [kgN/(kgVSS·day)]. If the sludge nitrification rate is less than 0.11 [kgN/(kgVSS·day)], then the effect of adding molybdenum is unremarkable. Further, if the sludge nitrification rate exceeds 0.24 [kgN/(kgVSS·day)], then ammonium nitrogen may sometimes remain in the nitrification tank, and depending on the pH inside the tank, an increase in the free ammonia concentration may cause a deterioration in the activity of the ammonia-oxidizing bacteria and nitrite-oxidizing bacteria, leading to a deterioration in the treatment performance.

The sludge nitrification rate is determined from the treatment amount (ammonium nitrogen concentration of water to be treated−ammonium nitrogen concentration of treated water [mg/L])×flow rate [m³/day], and from the amount of sludge in the tank (MLSS [mg/L]×water tank volume [m³]). The ammonium nitrogen concentration of the water to be treated, the ammonium nitrogen of the treated water and the sludge concentration inside the nitrification device 10 may be measured, and the flow rate of the water to be treated supply pump 17 may then be adjusted so as to obtain the prescribed sludge treatment rate. Further, control of the amount of molybdenum added relative to the amount of ammonium nitrogen inflow may be achieved using the molybdenum compound supply pump 21. In this case, the water to be treated supply pump 17, the flow rate measurement device 19 and the molybdenum compound supply pump 21 function as the nitrification rate control unit, which performs control such that, in the nitrification device 10, the molybdenum compound is allowed to be present in the water to be treated so as to obtain a molybdenum concentration of equal to or more than 0.025 mgMo/gN, and the sludge nitrification rate is equal to or more than 0.11 [kgN/(kgVSS·day)]. The water to be treated supply pump 17, the flow rate measurement device 19, and the molybdenum compound supply pump 21 may be connected electrically or the like to a control device and subjected to automatic control.

Generally, when conducting biological treatment of wastewater, in order to maintain growth and the metabolic reactions of the microbes, the nutrient balance in the water to be treated must be maintained. Carbon (C), oxygen (O), nitrogen (N), hydrogen (H) and phosphorus (P), which are known as the "biophile elements", are essential components that are required as nutrients for the structural components of cells. In addition, although required in comparatively small amounts compare with the biophile elements, sulfur (S), potassium (K), sodium (Na), calcium (Ca), magnesium (Mg), chlorine (Cl) and iron (Fe) are also essential cell structural elements. When the amount of any of these elements in the water to be treated is low, supplementary addition of the element may be performed. On the other hand, although the amounts required are small, it is also desirable to include trace elements which contribute to enzymatic metabolism by the microbes, such as fluorine (F), silicon (Si), vanadium (V), chromium (Cr), manganese (Mn), cobalt (Co), nickel (Ni), copper (Cu), zinc (Zn), arsenic (As), selenium (Se), molybdenum (Mo) and iodine (I). However, trace elements containing these heavy metals are only required in extremely small amounts, and because it is assumed that adequate amounts are already contained in the water to be treated, these heavy metals are usually not added to the water to be treated or the treatment system. On the other hand, in the case of biological treatment of wastewater discharged from a plant that uses ultrapure water, such as in the semiconductor industry, in those cases where the above types of trace elements are considered to be lacking, supplementation may sometimes be conducted by mixing tap water, industrial water, or well water or the like with the water to be treated. However, when the nitrogen concentration in the water to be treated is comparatively high (for example, 100 mgN/L or greater), the nitrification rate may sometimes decrease. Even in these types of situations, in the water treatment method and water treatment device according to embodiments of the present disclosure, by supplying a prescribed amount of a molybdenum compound to the treatment system, stabilization of the treatment and a high treatment rate can be achieved.

The reactions relating to the treatment of nitrogen components in the water to be treated can be mainly classified as follows.

1. $NH_4^+ \to NO_2^-$ (ammonia-oxidizing bacteria)
2. $NO_2^- \to NO_3^-$ (nitrite-oxidizing bacteria)
3. $NO_3^- \to N_2$ (denitrifying bacteria)

In terms of the catabolic reduction reaction of nitrate by denitrifying bacteria under anoxic conditions (nitrate respiration), biochemical investigations are continuing. For example, according to Non-Patent Document 2, the reaction from nitrate to nitrogen gas can be subdivided into [$NO_3^- \rightarrow NO_2^- \rightarrow NO \rightarrow N_2O \rightarrow N_2$], and it is evident that molybdenum element participates in the enzyme that catalyzes the reduction reaction [$NO_3^- \rightarrow NO_2^-$]. In other words, it is assumed that in the denitrification reaction in a wastewater treatment system, the activity can be increased by adding a molybdenum compound, although the amount required remains unclear.

Furthermore, the fact that nitrite-oxidizing bacteria require molybdenum when oxidizing nitrite has been identified by research. For example, in Non-Patent Document 3, investigation of the culturing conditions for the nitrite-oxidizing bacteria *Nitrobacter* revealed that by adding at least $10^{-9}$ M of molybdenum, the utilization of nitrite by the *Nitrobacter* and the cell growth increased by 11-fold. In other words, in relation to the nitrite oxidation reaction in a wastewater system, it is assumed that addition of a molybdenum compound will improve the activity.

On the other hand, the enzymes involved in the ammonia-oxidizing metabolism of the ammonia-oxidizing bacteria include two types of enzymes, namely ammonium monooxygenase (AMO) which oxidizes ammonia and produces hydroxylamine, and hydroxylamine oxidoreductase (HAO) which produces nitrite from the produced hydroxylamine, but there are no reports that these reactions are enzyme reactions in which molybdenum participates (see Non-Patent Document 4).

Patent Document 1 discloses a method in which, in order to enable the nitrification reaction to proceed efficiently, cobalt is introduced into the water to be treated, and molybdenum, calcium and magnesium components are also introduced. In the examples of Patent Document 1, a nitrification-denitrification treatment test of a water to be treated having a comparatively low nitrogen concentration of 70 mgN/L was investigated in the presence of a molybdenum concentration of 1 mgMo/L (14.3 mgMo/gN), and under conditions in which the nitrification sludge loading was 2.5 gN/(kgMLSS·hour) [=0.06 kgN/(kgMLSS·day)], the nitrogen removal rate was 90%, but it is difficult to consider this a remarkable effect.

The inventors of the present disclosure discovered that in a method for treating a water to be treated containing a particularly high concentration of nitrogen using a microbial activated sludge containing both ammonia-oxidizing bacteria and nitrite-oxidizing bacteria, by supplying a prescribed amount of molybdenum, not only the nitrite oxidation reaction, but also the activity of the ammonia-oxidizing bacteria, could be improved dramatically. Further, the inventors of the present disclosure also discovered that in a method for treating a water to be treated containing a particularly high concentration of nitrogen using a microbial activated sludge containing a variety of bacteria including ammonia-oxidizing bacteria, nitrite-oxidizing bacteria and denitrifying bacteria, by supplying a prescribed amount of molybdenum, not only the nitrite oxidation and denitrification (nitrate reduction) reactions, but also the activity of the ammonia-oxidizing bacteria, could be improved dramatically. In a microbial activated sludge containing both autotrophic bacteria such as ammonia-oxidizing bacteria and nitrite-oxidizing bacteria, and heterotrophic bacteria such as denitrifying bacteria that can assimilate organic matter, the heterotrophic bacteria including denitrifying bacteria, which have a higher growth rate than the nitrifying bacteria, predominate in the sludge.

The metabolism reactions of the various bacteria are usually thought to be independent of one another, but in a microbial activated sludge in which a plurality of functional microbes exist, each of the types of bacteria exists in a coexistence relationship. Although the mechanism by which addition of a molybdenum compound increases the ammonia-oxidizing activity is unclear, it is surmised that because the metabolic activity of the heterotrophic bacteria such as denitrifying bacteria can be increased by the supply of molybdenum, this is also linked to a relative improvement in the ammonia oxidation activity.

In embodiments of the present disclosure, the water to be treated that represents the treatment target is a nitrogen-containing water that contains ammonium nitrogen, and in particular, is a nitrogen-containing water that contains a high concentration of ammonium nitrogen, and may also contain organic nitrogen. Examples of the water to be treated include industrial wastewater such as electronic industry wastewater, metallurgical plant wastewater and power plant wastewater, as well as wastewater containing nitrification release water discharged during a sludge treatment process. Electronic industrial wastewater contains various chemicals, and the components of the wastewater differ considerably depending on the products being produced, but examples of nitrogen-containing water include the wastewater from wafer cleaning. This wastewater contains ammonia, and frequently also contains tetramethylammonium hydroxide (TMAH), hydrogen peroxide, fluoride ions, and isopropyl alcohol (IPA) and the like.

The molybdenum concentration in the water to be treated is, for example, 0.0001 mgMo/L or less. Further, in those cases where the nitrogen concentration in the water to be treated may be equal to or more than 100 mgN/L, and may be 400 mgN/L or greater, the water treatment method and water treatment device of embodiments of the present disclosure can be employed favorably.

When biologically treating this type of nitrogen-containing water, inhibitors such as hydrogen peroxide and fluoride ions have an inhibitory effect on living organisms, and therefore may be removed in advance. Known techniques may be used as the treatment method for these inhibitors, and for example, treatments for hydrogen peroxide include methods in which an enzyme is added, methods in which a reducing agent is introduced, and methods in which the water is brought into contact with activated carbon. Further, examples of treatments for fluoride ions include methods in which calcium is added and the fluoride is removed as calcium fluoride, and methods in which treatment is conducted using an ion exchange resin.

The nitrogen-containing water from which inhibitors such as hydrogen peroxide and fluoride ions have been removed is initially stored temporarily in a water tank prior to treatment by the biological treatment step, and the flow rate and water quality of the water supplied to the biological treatment step may be stabilized, and the pH may be adjusted to an appropriate level (for example, pH 6.5 to 8.0) using a pH adjuster such as an acid or alkali. The nitrogen-containing water (water to be treated) for which the flow rate, water quality and pH and the like have been adjusted may then be supplied to the biological treatment step.

The nitrification step in the nitrification device 10 is a step of supplying the water to be treated to a nitrification section (for example, a nitrification tank), and oxidizing the ammonium nitrogen such as ammonium ions contained in the water to be treated to obtain nitrite or nitrate nitrogen under aerobic conditions (for example, in the presence of oxygen). For example, an air inlet line may be connected to the nitrification section, to form a structure in which an oxygen-containing gas such as air can be supplied to the water to be treated inside the nitrification section. Then, inside the nitrification section, the action of the nitrifying bacteria nitrifies the ammonium nitrogen such as ammonium ions in the water to be treated to nitrite or nitrate nitrogen. Here, the term "nitrifying bacteria" is a generic term referring to autotrophic ammonia-oxidizing bacteria that oxidize ammonium nitrogen such as ammonium ions to nitrite ions, and autotrophic nitrite-oxidizing bacteria that oxidize nitrite ions to nitrate ions.

In those cases where the molybdenum contained in the water to be treated is insufficient, a molybdenum compound may be added from externally. The molybdenum compound is supplied, for example in the form of a molybdenum compound solution, to the water to be treated through the molybdenum compound supply line 26, and the molybdenum compound is then supplied to the system by mixing with the water to be treated. The molybdenum compound may be supplied, for example, in an amount proportional to the amount of nitrogen being treated. By supplying a prescribed amount of the molybdenum compound, the activity of the nitrifying bacteria (the ammonia-oxidizing bacteria and nitrite-oxidizing bacteria) and the activity of the denitrifying bacteria can be maintained at high levels, enabling stable operation or high-speed treatment.

Examples of the molybdenum compound include molybdate compounds such as sodium molybdate, potassium molybdate and ammonium molybdate. There are no particular limitations on the form of the molybdenum compound, but a solution state is more readily utilizable by the bacteria in the microbial activated sludge, and for example, preparation in advance of an aqueous solution of sodium molybdate or potassium molybdate or the like, and then addition of this aqueous solution may be made.

In terms of the location at which the molybdenum compound is added, the molybdenum compound may be supplied to the line 16 at a point prior to the nitrification treatment, or may be supplied to the nitrification device 10 containing the mixed water to be treated and microbial activated sludge. Further, if consideration is given to the fact that the added molybdenum compound will be returned to upstream of the solid-liquid separation step as part of the returned sludge, and therefore circulated through the system, supply of the molybdenum compound may also be conducted by connecting the molybdenum compound supply line to the line 18 or the denitrification device 12.

In the nitrification device 10 (the nitrification step), the molybdenum compound may be allowed to be present in the water to be treated so as to obtain a molybdenum concentration of equal to or more than 0.025 mgMo/gN, but the molybdenum compound may be allowed to be present in the water to be treated so as to obtain a molybdenum concentration of equal to or more than 0.1 mgMo/gN. Although there are no particular limitations on the upper limit for the molybdenum concentration, the concentration is, for example, typically 0.25 mgMo/gN or less. In the nitrification device 10 (the nitrification step), if the molybdenum concentration in the water to be treated is less than 0.025 mgMo/gN, then the activity maintenance effect on the nitrifying bacteria (the ammonia-oxidizing bacteria and nitrite-oxidizing bacteria) and the denitrifying bacteria may not manifest.

In the nitrification device 10 (the nitrification step), the molybdenum concentration may be not more than 2 mgMo/L relative to the water to be treated. If the molybdenum concentration exceeds 2 mgMo/L relative to the water to be treated, then the nitrification reaction may sometimes be inhibited.

A carrier for supporting the microbes may be installed inside the nitrification section. There are no particular limitations on the carrier used for supporting the microbes, but may use a carrier made of a resin such as a plastic or polyurethane.

The denitrification step in the denitrification device 12 is, for example, a step of supplying a hydrogen donor to a complete mixing denitrification section (for example, a denitrification tank), and reducing the nitrite or nitrate nitrogen produced in the nitrification section under anoxic conditions to obtain nitrogen gas. In the denitrification section (for example, the denitrification tank), the action of the denitrifying bacteria, which are heterotrophic bacteria, reduces the nitrite or nitrate nitrogen to nitrogen gas. In the denitrification section, in order to ensure more efficient treatment, a stirring device may be provided for mixing the nitrified liquid and the microbial activated sludge under anoxic conditions.

A carrier for supporting the microbes may be installed inside the denitrification section. There are no particular limitations on the carrier used for supporting the microbes, but may use a carrier made of a resin such as a plastic or polyurethane.

Examples of the hydrogen donor that is used in embodiments of the present disclosure for conducting the denitrification include one or a plurality of compounds selected from among alcohols such as methanol, ethanol and isopropyl alcohol, organic acids such as acetic acid, and hydrogen gas, acetone, glucose, ethyl methyl ketone and tetramethylammonium hydroxide (TMAH), but this is not an exhaustive list, and any conventional compound used as a hydrogen donor may be used. Organic matter or the like contained in the water to be treated may also be used as a hydrogen donor.

The solid-liquid separation step in the solid-liquid separation device 14 is a step of obtaining a treated water by separating the denitrified liquid, obtained by subjecting the nitrogen components to nitrification and denitrification treatments using the nitrifying bacteria and denitrifying bacteria contained in the microbial activated sludge, into a treated water and a microbial activated sludge.

There are no particular limitations on the solid-liquid separation device 14, and examples include separation devices that employ sedimentation separation, pressure flotation, filtration, or membrane separation or the like. In the solid-liquid separation step, a treated water is obtained, and a separated microbial activated sludge is also obtained, and a portion of this microbial activated sludge is extracted from the system as excess sludge, while a portion may be returned, for example, to the nitrification device 10 (the nitrification step) to maintain the amount of microbial activated sludge in the system.

A hydrogen donor is added to the denitrification device 12, but in those cases where there may be a possibility that some hydrogen donor remains following the denitrification treatment, adversely affecting the treated water quality, an oxidation device that functions as an oxidation unit for aerobically treating the hydrogen donor may be installed between the denitrification device 12 (the denitrification step) and the solid-liquid separation device 14 (the solid-liquid separation step).

Figure 2:
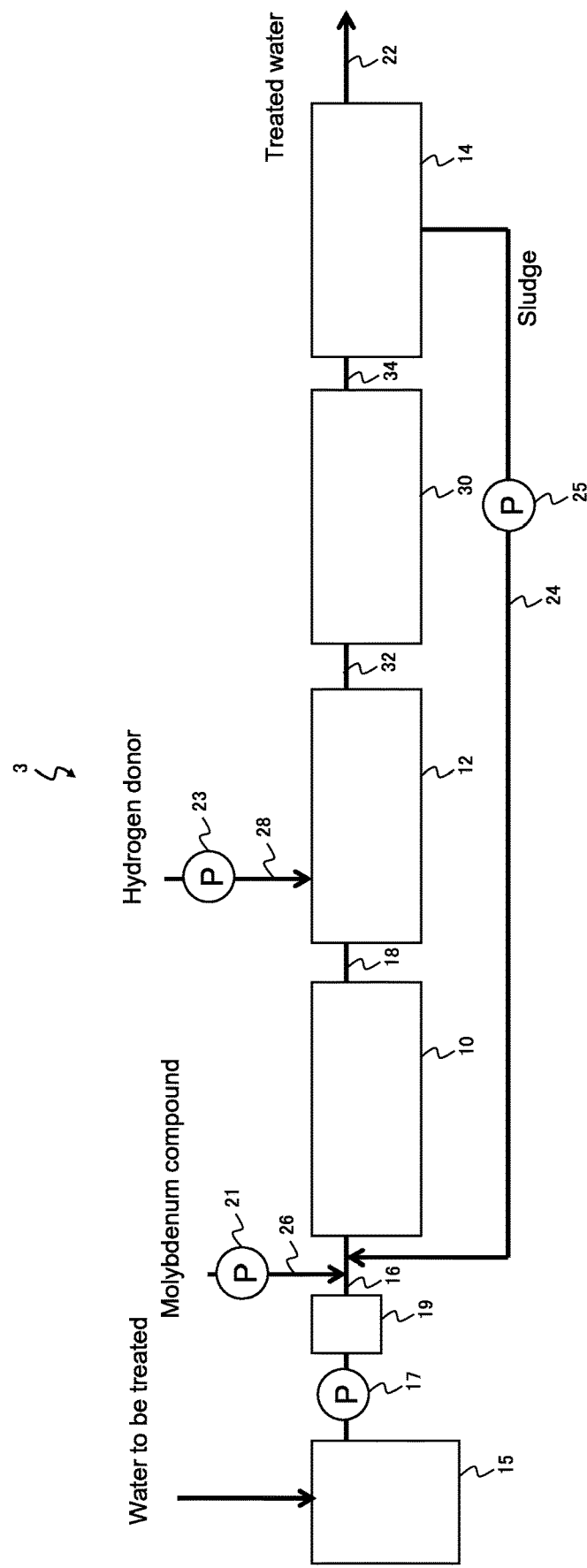
FIG. 2 is a schematic structural diagram illustrating another example of a water treatment device according to an embodiment of the present disclosure.

An example of a water treatment device having this type of structure is illustrated in FIG. 2. In the water treatment device 3 of FIG. 2, an oxidation device 30 is provided between the denitrification device 12 (the denitrification step) and the solid-liquid separation device 14 (the solid-liquid separation step). The outlet of the denitrification device 12 and the inlet of the oxidation device 30 are connected via a line 32, and the outlet of the oxidation device 30 and the inlet of the solid-liquid separation device 14 are connected via a line 34.

The denitrified liquid obtained in the denitrification device 12 (the denitrification step) passes through the line 32 and is fed into the oxidation device 30. In the oxidation step in the oxidation device 30, the hydrogen donor is aerobically treated in an oxidation section (for example, an oxidation tank). For example, an air inlet line similar to that used in the nitrification section may be connected to the oxidation section (such as an oxidation tank), forming a structure in which an oxygen-containing gas such as air can be supplied to the water to be treated inside the oxidation section.

The oxidation-treated liquid that has undergone oxidation treatment in the oxidation device 30 passes through the line 34 and is fed into the solid-liquid separation device 14, and thereafter, treatment is conducted in the same manner as the water treatment device 1 of FIG. 1.

In those cases where the water to be treated contains organic matter and nitrogen, the denitrification reaction may be initiated using the organic matter in the water to be treated as a hydrogen donor, without requiring external addition of a hydrogen donor for the denitrification reaction.

Figure 3:
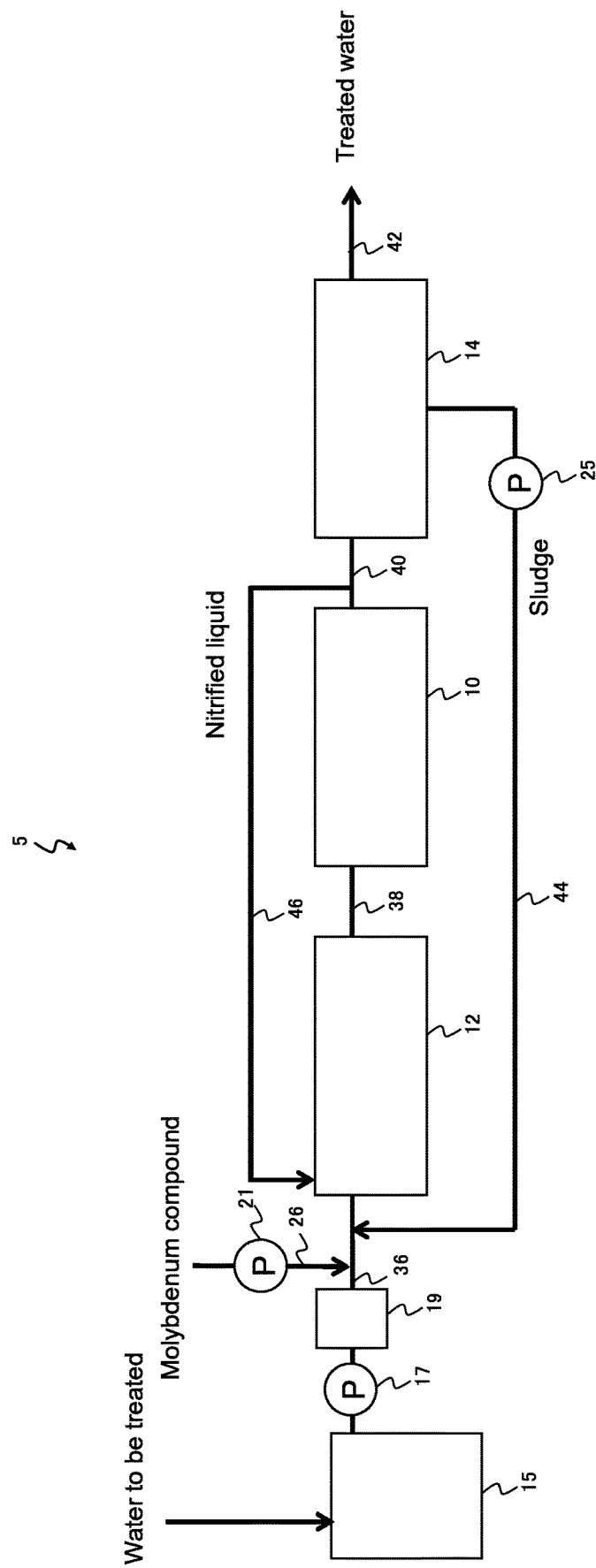
FIG. 3 is a schematic structural diagram illustrating another example of a water treatment device according to an embodiment of the present disclosure.

An example of a water treatment device having this type of structure is illustrated in FIG. 3. In the water treatment device 5 of FIG. 3, the outlet of the water to be treated balancing tank 15 and the inlet of the denitrification device 12 are connected by a line 36 via the water to be treated supply pump 17, the outlet of the denitrification device 12 and the inlet of the nitrification device 10 are connected by a line 38, the outlet of the nitrification device 10 and the inlet of the solid-liquid separation device 14 are connected by a line 40, a line 42 is connected to the treated water outlet of the solid-liquid separation device 14, and the sludge outlet of the solid-liquid separation device 14 and the line 36 are connected by a sludge return line 44 via the sludge return pump 25. The flow rate measurement device 19 for measuring the flow rate of the water to be treated is installed within the line 36 at a location downstream from the water to be treated supply pump 17, and the molybdenum compound supply line 26 is connected to the line 36 via the molybdenum compound supply pump 21 at a location downstream from the flow rate measurement device 19 but upstream of the connection point of the sludge return line 44. The line 40 and the denitrification device 12 are connected by a nitrified liquid return line 46.

In the water treatment device 5, the water to be treated containing ammonium nitrogen is fed from the water to be treated balancing tank 15 through the line 36 and into the denitrification device 12 by the water to be treated supply pump 17. On the other hand, at least a portion of the nitrified liquid from the downstream nitrification device 10 is fed into the denitrification device 12 through the nitrified liquid return line 46. Further, a molybdenum compound is supplied through the molybdenum compound supply line 26 to the water to be treated in the line 36 by the molybdenum compound supply pump 21, and the molybdenum compound is allowed to be present in the water to be treated so as to obtain a molybdenum concentration of equal to or more than 0.025 mgMo/gN (the molybdenum compound supply step).

In the nitrification device 10, the ammonium nitrogen contained in the water to be treated is oxidized to obtain nitrite or nitrate nitrogen using the nitrifying bacteria including autotrophic ammonia-oxidizing bacteria and nitrite-oxidizing bacteria contained in the microbial activated sludge (the nitrification step). In the denitrification device 12, the nitrite or nitrate nitrogen produced in the nitrification device 10 (in the nitrification step) is reduced to nitrogen gas by the heterotrophic denitrifying bacteria contained in the microbial activated sludge (the denitrification step). The denitrified liquid is fed through the line 38 and into the nitrification device 10, and at least a portion of the nitrified liquid passes through the line 40 and is fed into the solid-liquid separation device 14. Thereafter, treatment is conducted in the same manner as the water treatment device 1 of FIG. 1.

In those cases where a further reduction in the nitrogen concentration of the treated water is required, a latter-stage denitrification device that functions as a latter-stage denitrification unit, and an oxidation device that functions as an oxidation unit, may also be provided between the nitrification device 10 and the solid-liquid separation device 14 in the water treatment device 5 of FIG. 3.

Figure 4:
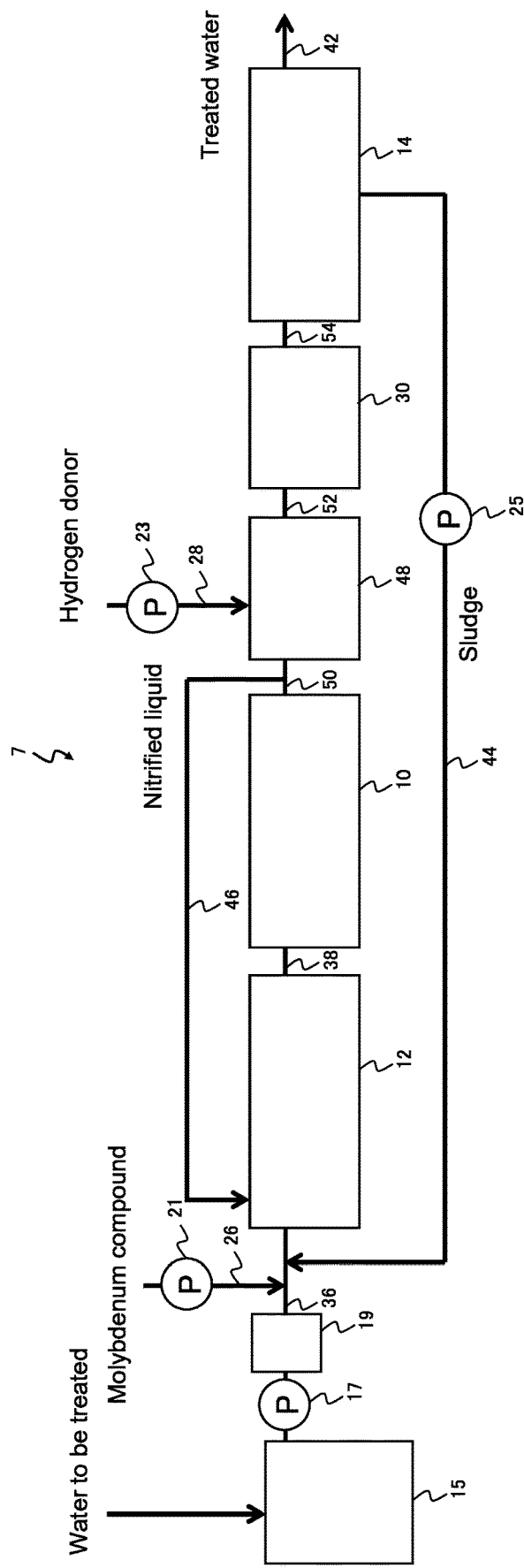
FIG. 4 is a schematic structural diagram illustrating another example of a water treatment device according to an embodiment of the present disclosure.

An example of a water treatment device having this type of structure is illustrated in FIG. 4. The water treatment device 7 of FIG. 4 includes a latter-stage denitrification device 48 that functions as a latter-stage denitrification unit, and an oxidation device 30 that functions as an oxidation unit. The outlet of the nitrification device 10 and the inlet of the latter-stage denitrification device 48 are connected by a line 50, the outlet of the latter-stage denitrification device 48 and the inlet of the oxidation device 30 are connected by a line 52, and the outlet of the oxidation device 30 and the inlet of the solid-liquid separation device 14 are connected by a line 54. The hydrogen donor supply line 28 is connected to the latter-stage denitrification device 48 via the hydrogen donor supply pump 23. The line 50 and the denitrification device 12 are connected by the nitrified liquid return line 46.

In the water treatment device 7, the water to be treated containing ammonium nitrogen is fed from the water to be treated balancing tank 15 through the line 36 and into the denitrification device 12 by the water to be treated supply pump 17. On the other hand, at least a portion of the nitrified liquid from the downstream nitrification device 10 is fed into the denitrification device 12 through the nitrified liquid return line 46. Further, a molybdenum compound is supplied through the molybdenum compound supply line 26 to the water to be treated in the line 36 by the molybdenum compound supply pump 21, and the molybdenum compound is allowed to be present in the water to be treated so as to obtain a molybdenum concentration of equal to or more than 0.025 mgMo/gN (the molybdenum compound supply step).

In the nitrification device 10, the ammonium nitrogen contained in the water to be treated is oxidized to obtain nitrite or nitrate nitrogen using the nitrifying bacteria including autotrophic ammonia-oxidizing bacteria and nitrite-oxidizing bacteria contained in the microbial activated sludge (the nitrification step). In the denitrification device 12, the nitrite or nitrate nitrogen produced in the nitrification device 10 (in the nitrification step) is reduced to nitrogen gas by the heterotrophic denitrifying bacteria contained in the microbial activated sludge (the denitrification step). The denitrified liquid is fed through the line 38 and into the nitrification device 10, at least a portion of the nitrified liquid passes through the line 50 and is fed into the latter-stage denitrification device 48, and in the latter-stage denitrification device 48, the nitrite or nitrate nitrogen produced in the nitrification device 10 (the nitrification step) is reduced to nitrogen gas by denitrifying bacteria (a denitrification step). The denitrified liquid passes through the line 52 and is fed into the oxidation device 30. Thereafter, treatment is conducted in the same manner as the water treatment device 3 of FIG. 2. At least a portion of the nitrified liquid passes through the nitrified liquid return line 46 and is fed into the denitrification device 12.

In the denitrification step, the microbial activated sludge containing the nitrifying bacteria and denitrifying bacteria may be granulated by imparting time variation to the amount added of the hydrogen donor so that the difference between the maximum concentration and the minimum concentration of the hydrogen donor in the hydraulic retention time for the treated water is equal to or more than 50 mgTOC/L. By varying the concentration of the hydrogen donor that is added during the denitrification reaction, the denitrifying bacteria can readily form self-assembled granules.

Moreover, by circulating these granules through a treatment system for a nitrogen-containing water that conducts nitrification and denitrification, all the bacterial groups including the nitrifying bacteria are granulated, enabling all of the treatment devices for the nitrogen-containing water to be treated to conduct treatment with substantially the same granules.

Further, in those cases where the difference between the maximum concentration and the minimum concentration of the hydrogen donor in the denitrification step is increased to ensure that granulation of the microbial activated sludge proceeds efficiently, the denitrification step may be divided into two or more steps including at least a first denitrification step and a second denitrification step. The denitrification step may include at least a first denitrification step and a second denitrification step, and in the denitrification step, the hydrogen donor may be supplied in at least the first denitrification step such that the difference between the maximum concentration of the hydrogen donor in the first denitrification step and the minimum concentration of the hydrogen donor in the second denitrification step in the hydraulic retention time of the treated water in the second denitrification step is equal to or more than 50 mgTOC/L.

Figure 5:
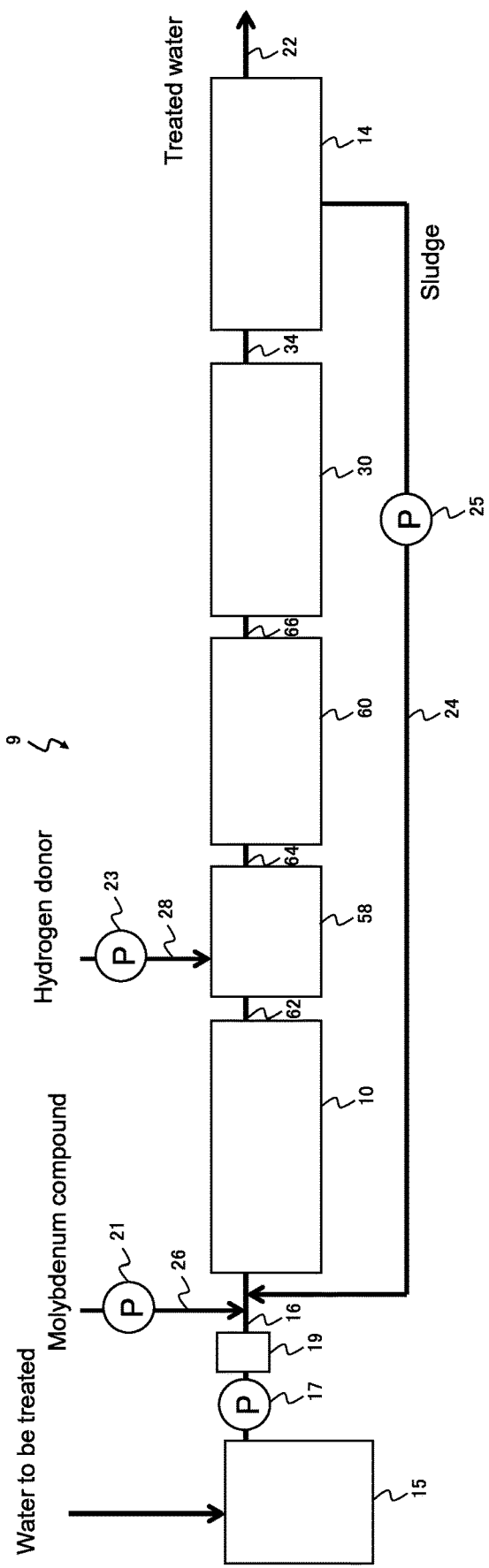
FIG. 5 is a schematic structural diagram illustrating another example of a water treatment device according to an embodiment of the present disclosure.

An example of a water treatment device having this type of structure is illustrated in FIG. 5. The water treatment device 9 of FIG. 5 includes a first denitrification device 58 and a second denitrification device 60 as denitrification units. The outlet of the nitrification device 10 and the inlet of the first denitrification device 58 are connected by a line 62, the outlet of the first denitrification device 58 and the inlet of the second denitrification device 60 are connected by a line 64, and the outlet of the second denitrification device 60 and the inlet of the oxidation device 30 are connected by a line 66.

The nitrified liquid obtained in the nitrification device 10 is fed through the line 62 and into the first denitrification device 58. In the first denitrification device 58, a hydrogen donor is supplied through the hydrogen donor supply line 28 by the hydrogen donor supply pump 23, and following contact with the heterotrophic denitrifying bacteria contained in the microbial activated sludge, the mixed liquid is fed through the line 64 and into the second denitrification device 60, and in the second denitrification device 60, the nitrite or nitrate nitrogen produced in the nitrification device 10 (the nitrification step) is reduced to nitrogen gas by the denitrifying bacteria (the denitrification step). The denitrified liquid passes through the line 66 and is fed into the oxidation device 30. Thereafter, treatment is conducted in the same manner as the water treatment device 3 of FIG. 2.

In the water treatment device 1 of FIG. 1, ammonium nitrogen concentration measurement devices that measure the concentration of ammonium nitrogen in the water to be treated balancing tank and the treated water tank may be installed so that the ammonium nitrogen concentration of the water to be treated and the treated water can be measured.

Figure 6:
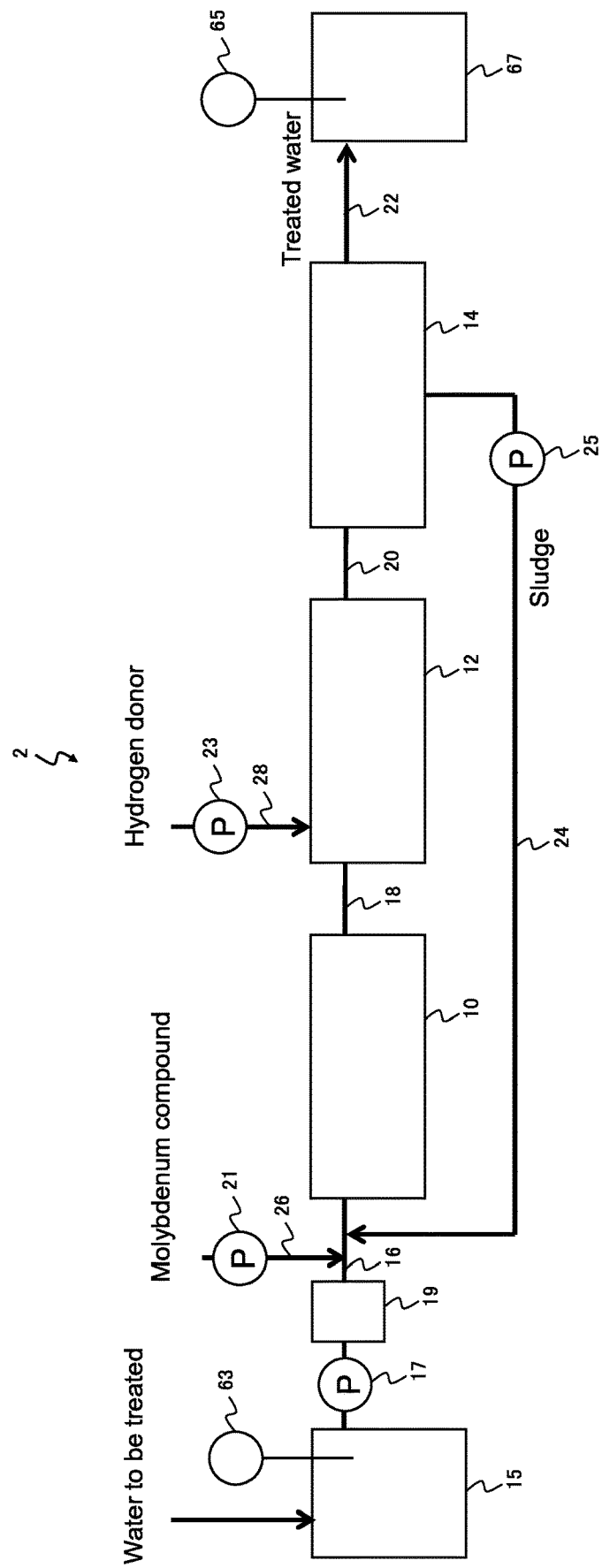
FIG. 6 is a schematic structural diagram illustrating another example of a water treatment device according to an embodiment of the present disclosure.

An example of a water treatment device having this type of structure is illustrated in FIG. 6. The water treatment device 2 of FIG. 6 may include a treated water tank 67 for storing the treated water, with the line 22 connected to the inlet of the treated water tank 67. Ammonium nitrogen concentration measurement devices 63 and 65 are installed as ammonium nitrogen concentration measurement units in the water to be treated balancing tank 15 and the treated water tank 67 respectively. The ammonium nitrogen concentration measurement device 65 may be installed in the nitrification device 10 instead of the treated water tank 67. This enables the amount of treatment in the nitrification device 10 to be ascertained.

A configuration may be adopted in which the ammonium nitrogen concentration of the water to be treated is measured by the ammonium nitrogen concentration measurement device 63, the ammonium nitrogen concentration of the treated water is measured by the ammonium nitrogen concentration measurement device 65, the sludge concentration inside the nitrification device 10 is measured, and the flow rate through the water to be treated supply pump 17 is adjusted so as to achieve a prescribed sludge treatment rate. Further, control of the amount of molybdenum added relative to the amount of nitrogen inflow may be conducted using the molybdenum compound supply pump 21. In this case, the water to be treated supply pump 17, the flow rate measurement device 19, the molybdenum compound supply pump 21, and the ammonium nitrogen concentration measurement devices 63 and 65 function as a nitrification rate control unit, which performs control such that, in the nitrification device 10, the molybdenum compound is allowed to be present in the water to be treated so as to obtain a molybdenum concentration of equal to or more than 0.025 mgMo/gN, and the sludge nitrification rate is equal to or more than 0.11 [kgN/(kgVSS·day)]. By using this configuration, changes in the concentration of the water to be treated can be tracked. The water to be treated supply pump 17, the flow rate measurement device 19, the molybdenum compound supply pump 21, and the ammonium nitrogen concentration measurement devices 63 and 65 may be connected electrically or the like to a control device and subjected to automatic control.

In the water treatment device 1 of FIG. 1, a carrier may be used in the nitrification device and the denitrification device.

Figure 7:
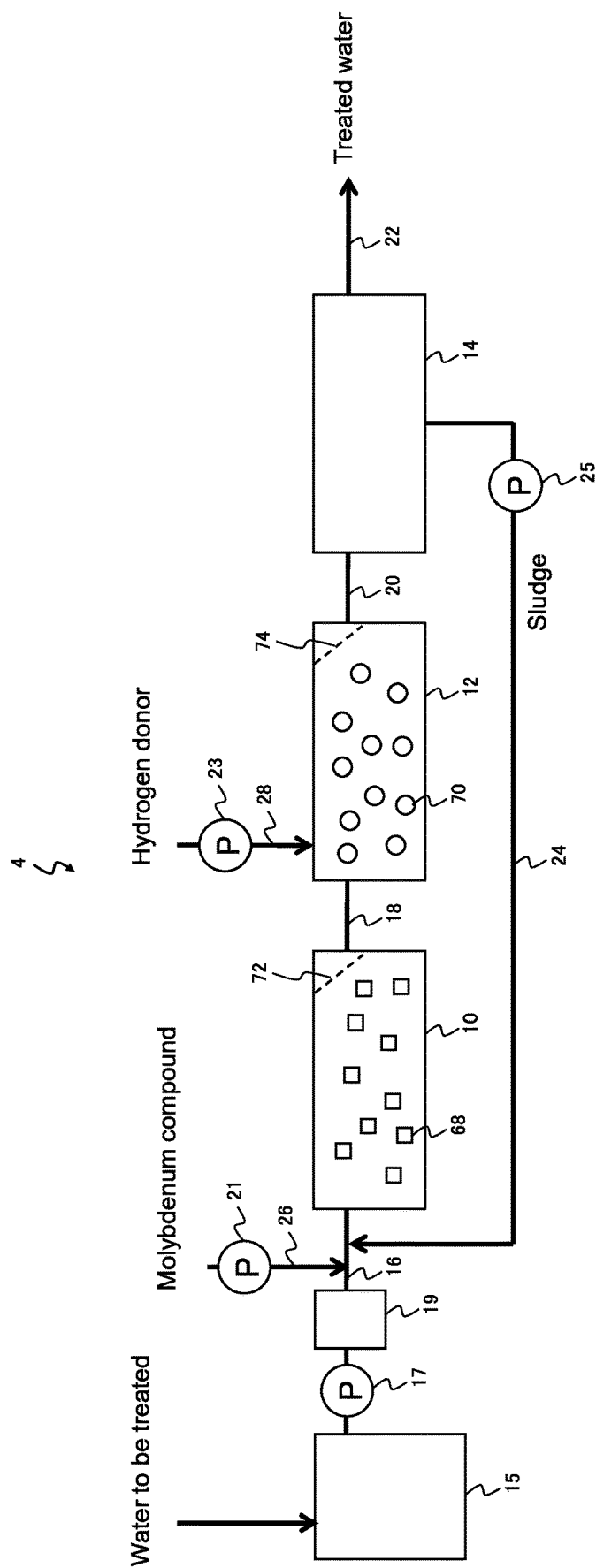
FIG. 7 is a schematic structural diagram illustrating another example of a water treatment device according to an embodiment of the present disclosure.

An example of a water treatment device having this type of structure is illustrated in FIG. 7. In the water treatment device 4 of FIG. 7, a carrier 68 is held inside the water tank of the nitrification device 10, and a carrier 70 is held inside the water tank of the denitrification device 12, and screens 72 and 74 are installed to inhibit the outflow of the carriers 68 and 70 from the outlets of the water tanks.

Measurement of the amount of sludge in the nitrification device 10 is calculated from measurement of the amount of sludge in the suspension, and the carrier fill amount. The amount of sludge adhered per carrier is substantially constant, and therefore measurement can be achieved by measuring the amount of sludge adhesion per unit carrier in advance.

In the water treatment device 4 of FIG. 7, a configuration may be used in which a solid-liquid separation device is not provided, and sludge return is not conducted.

Figure 8:
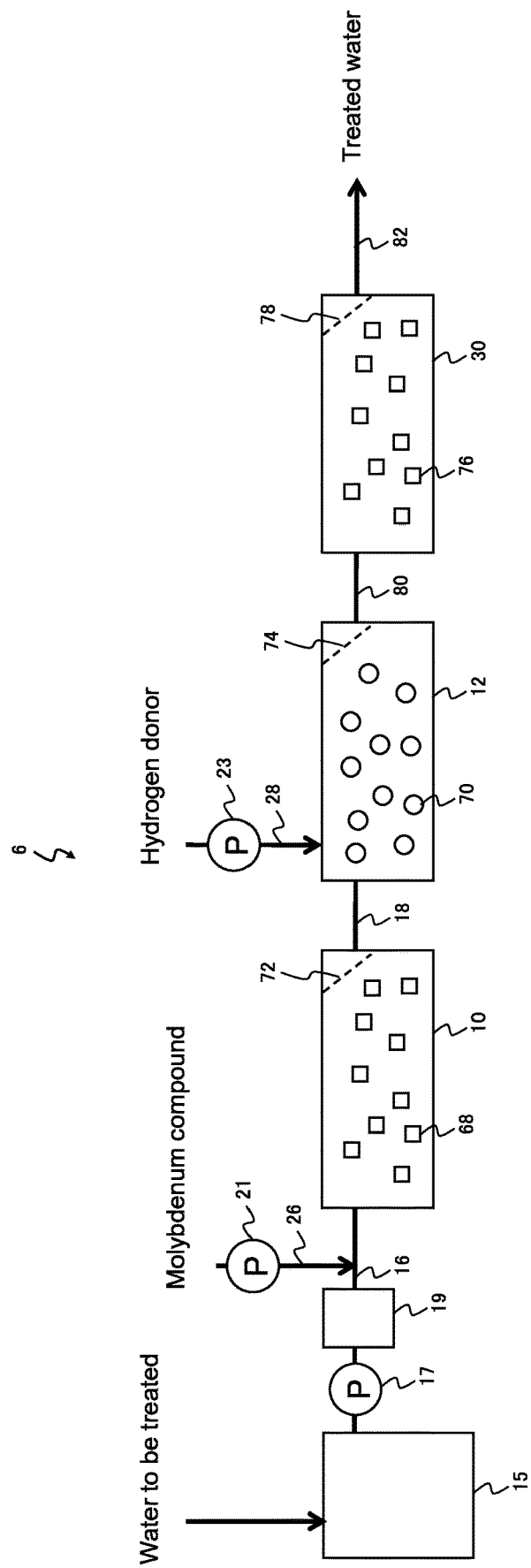
FIG. 8 is a schematic structural diagram illustrating another example of a water treatment device according to an embodiment of the present disclosure.

An example of a water treatment device having this type of structure is illustrated in FIG. 8. The water treatment device 6 of FIG. 8 includes the oxidation device 30 provided at a stage subsequent to the denitrification device 12. A carrier 76 is held inside the water tank of the oxidation device 30, and a screen 78 is installed to inhibit the outflow of the carrier 76 from the outlet of the water tank.

In the water treatment device 6 of FIG. 8, the outlet of the denitrification device 12 and the inlet of the oxidation device 30 are connected by a line 80, and a line 82 is connected to the treated water outlet of the oxidation device 30.

The denitrified liquid obtained in the denitrification device 12 (the denitrification step) passes through the line 80 and is fed into the oxidation device 30. In the oxidation step in the oxidation device 30, the hydrogen donor is treated aerobically in an oxidation section (for example, an oxidation tank). For example, an air inlet line similar to that used in the nitrification section may be connected to the oxidation section (such as an oxidation tank), forming a structure in which an oxygen-containing gas such as air can be supplied to the water to be treated inside the oxidation section.

The hydrogen donor is added in the denitrification device 12, but in those cases where there may be a possibility that some hydrogen donor remains following the denitrification treatment, adversely affecting the treated water quality, the hydrogen donor may be treated aerobically in the oxidation device 30.

EXAMPLES

The present disclosure is described below in more specific detail using a series of examples and comparative examples, but the present disclosure is in no way limited by the following examples.

Examples and comparative examples using a continuous water flow tester are described below. In all cases, testing was performed with room temperature controlled at 20° C.

Example 1

Figure 9:
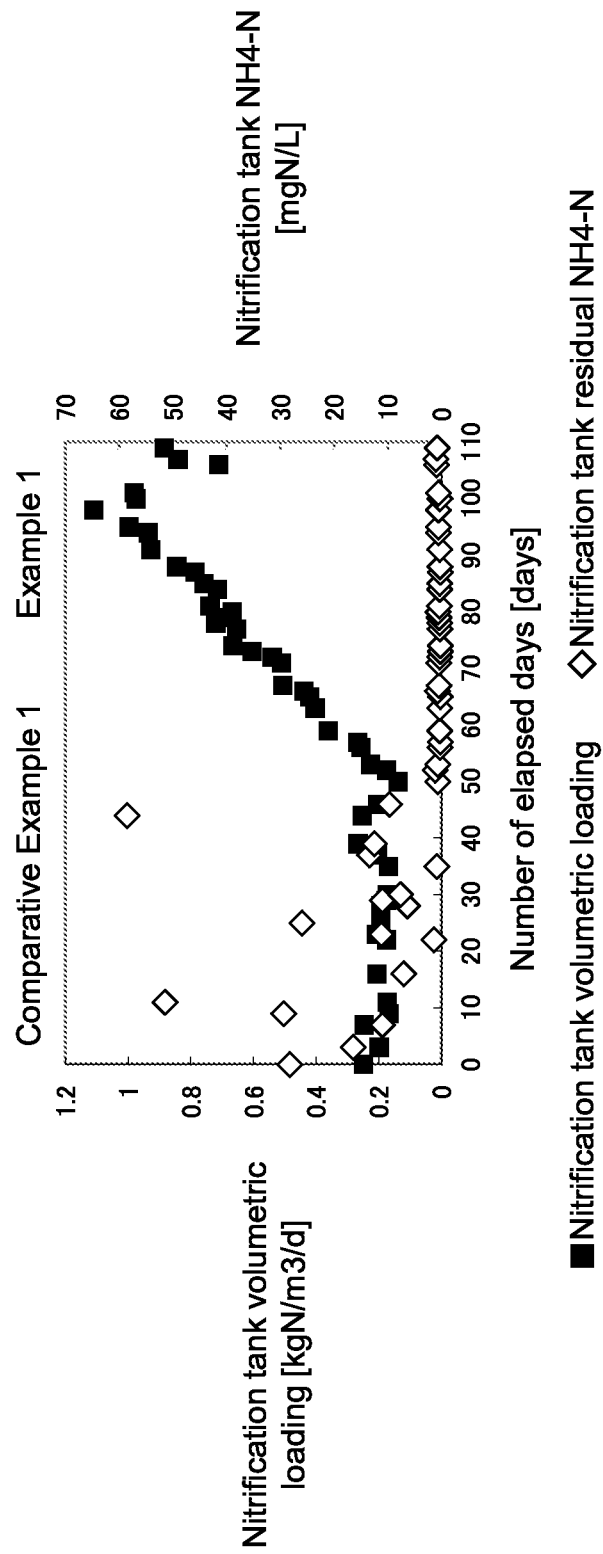
FIG. 9 is a graph illustrating the nitrification tank volumetric loading [kgN/(m$^3$·d)] and the nitrification tank ammonium nitrogen concentration [mgN/L] relative to the number of elapsed days [day] in Example 1 and Comparative Example 1.
Figure 10:
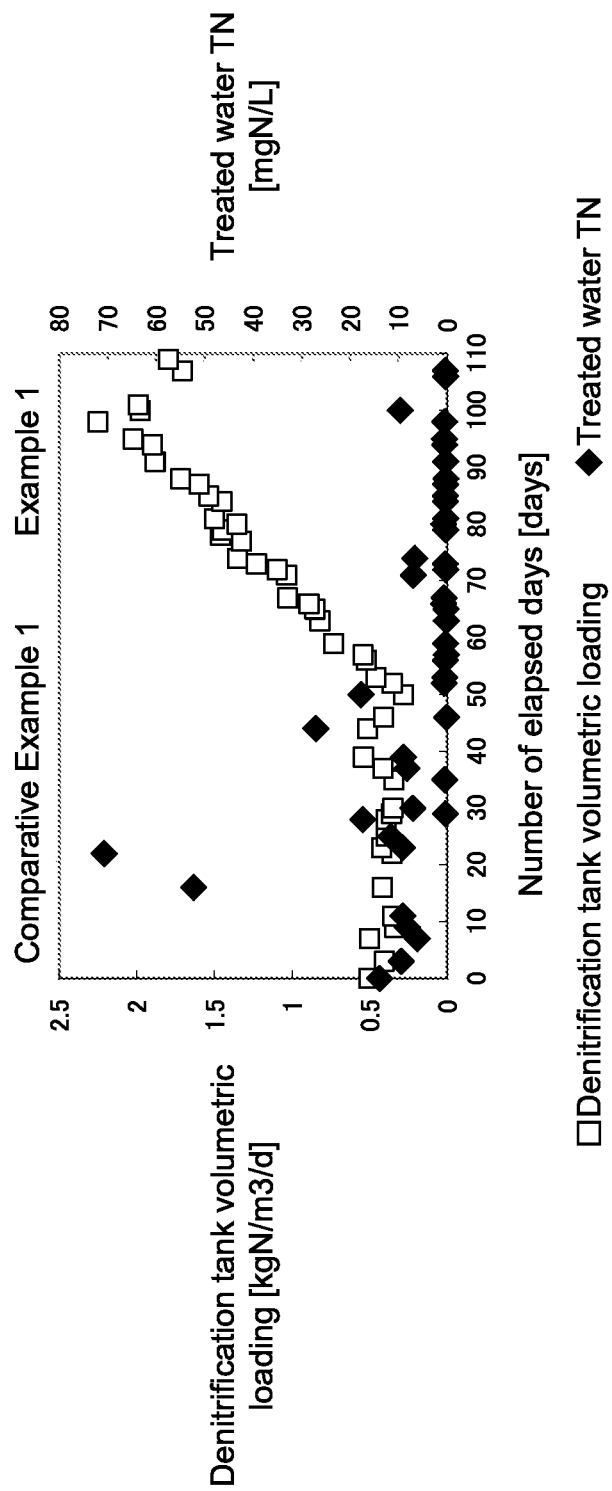
FIG. 10 is a graph illustrating the denitrification tank volumetric loading [kgN/(m$^3$·d)] and the treated water total nitrogen concentration [mgN/L] relative to the number of elapsed days [day] in Example 1 and Comparative Example 1.

In Example 1, a bench-scale tester having the structure of the water treatment device 9 illustrated in FIG. 5 was used. The nitrifying bacteria and denitrifying bacteria were granulated, and a nitrification-denitrification treatment test of a simulated wastewater was conducted. For the simulated wastewater, a solution was prepared by dissolving ammonium nitrogen in pure water to achieve a concentration of 400 mgN/L, and phosphoric acid and a trace elements chemical solution were added as other nutrient sources. The trace elements chemical solution used in this test contained no molybdenum. Methanol was use as the hydrogen donor for the denitrification and was added intermittently to the first denitrification tank, so that the difference between the maximum methanol concentration in the first denitrification tank and the minimum methanol concentration in the second denitrification tank was equal to or more than 50 mgTOC/L. A pH controller was installed in each of the nitrification tank, the first denitrification tank and the second denitrification tank, and hydrochloric acid or sodium hydroxide was used to adjust the pH within each tank to a value of 7 to 7.5. The concentrated sludge obtained from the solid-liquid separation tank was returned to the nitrification tank. No molybdenum addition was performed from day 0 to day 45 (Comparative Example 1), and from day 46, addition of a molybdenum compound (sodium molybdate) at a concentration of 0.1 mgMo/L relative to the water to be treated was started (Example 1). The concentration of the added molybdenum yielded conditions of 0.25 mgMo/gN relative to the nitrogen concentration of the water to be treated. The results are shown in FIGS. 9 and 10. FIG. 9 illustrates the changes in the nitrification tank volumetric loading [kgN/(m$^3$·d)] and the nitrification tank ammonium nitrogen concentration [mgN/L], whereas FIG. 10 illustrates the changes in the denitrification tank volumetric loading [kgN/(m$^3$·d)] and the treated water total nitrogen concentration [mgN/L] relative to the number of elapsed days [day].

In the initial stages of Comparative Example 1, water flow was started at a volumetric loading of 0.2 kgN/(m$^3$·d) in the nitrification tank, but 5 to 60 mgN/L of ammonium nitrogen remained in the nitrification tank, meaning the loading could not be increased, and the nitrification rate stagnated at 0.15 to 0.25 kgN/(m$^3$·d). With this stagnation in the nitrification rate, the denitrification rate also stagnated at 0.3 to 0.5 kgN/(m$^3$·d). During the period of Comparative Example 1, the sludge treatment rate at which stable operation was possible was 0.05 kgN/(kgVSS·d) for the nitrification.

Next, when molybdenum addition to the water to be treated was started, an increase in the treatment rate was noticed, and a maximum nitrification rate of 1.1 kgN/(m$^3$·d) was confirmed. During Example 1, the amount of ammonium nitrogen in the nitrification tank transitioned to a value that was always 1 mgN/L or less. As the nitrification rate increased, an increase in the denitrification rate was also noticed, and a maximum of 2.2 kgN/(m$^3$·d) was reached. During the period of Comparative Example 1, the sludge treatment rate, which indicates the sludge activity, at which stable operation was able to be confirmed was 0.24 kgN/(kgVSS·d) for the nitrification and 0.54 kgN/(kgVSS·d) for the denitrification.

Comparative Example 2

In Comparative Example 2, a bench-scale tester having the structure of the water treatment device 9 illustrated in FIG. 5 was used, and a continuous water flow test was conducted. For the simulated wastewater, a solution was prepared by dissolving ammonium nitrogen in pure water to achieve a concentration of 800 mgN/L, and phosphoric acid and a trace elements chemical solution (containing no molybdenum) were also added. In order to replenish the trace elements, a well water containing no molybdenum (molybdenum concentration: 0.0001 mgMo/L or less (below the detection limit)) was added from day 120 to day 215, and then from day 216 to day 280, an industrial water containing molybdenum was added at a rate that was 10% of the flow rate of the water to be treated. The molybdenum concentration in the industrial water was 0.0006 mgMo/L. The molybdenum concentrations of the well water and the industrial water were measured using ICP mass spectrometry (ICP-MS).

Figure 11:
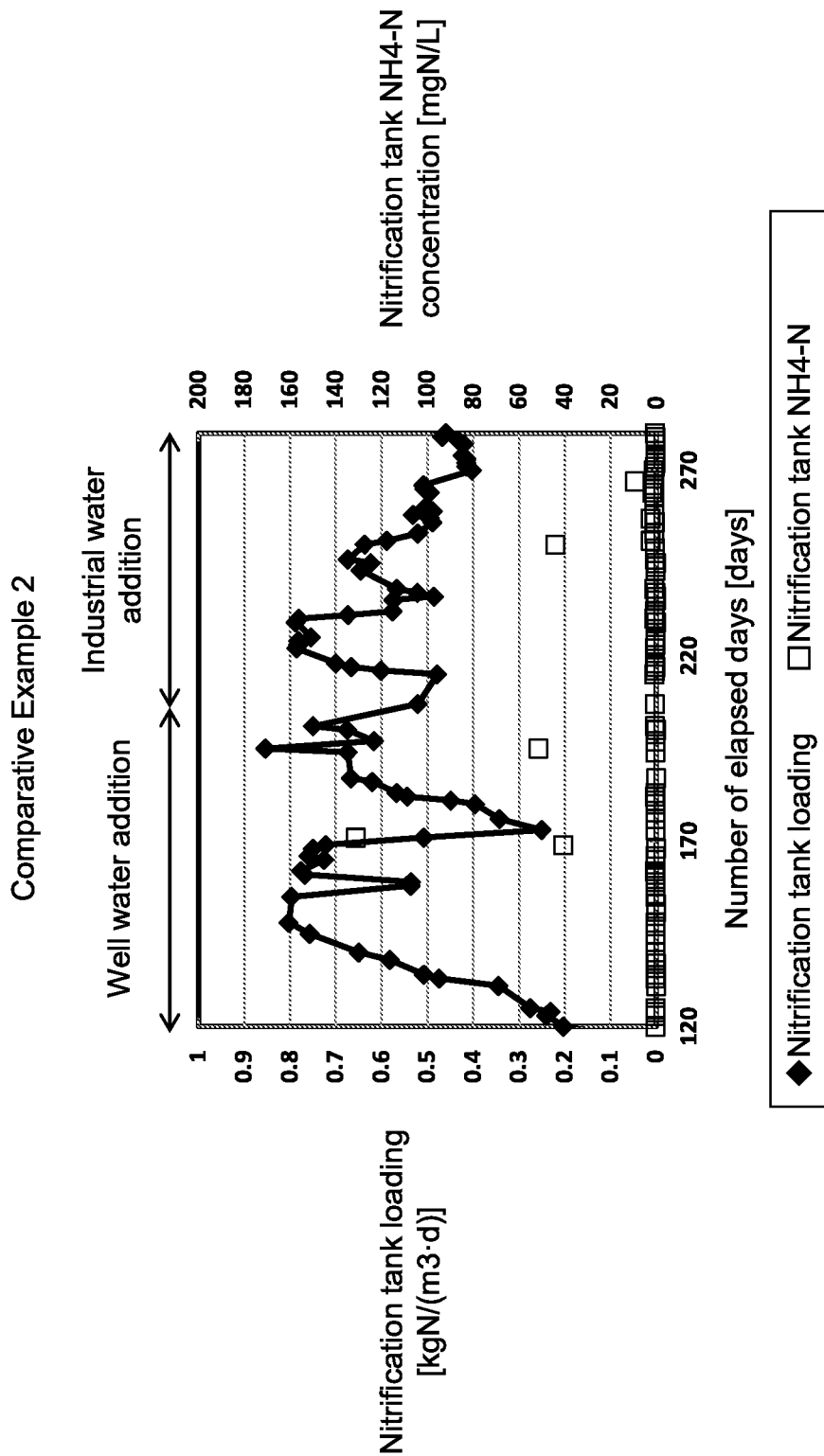
FIG. 11 is a graph illustrating the nitrification tank volumetric loading [kgN/(m$^3$·d)] and the nitrification tank ammonium nitrogen concentration [mgN/L] relative to the number of elapsed days [day] in Comparative Example 2.
Figure 12:
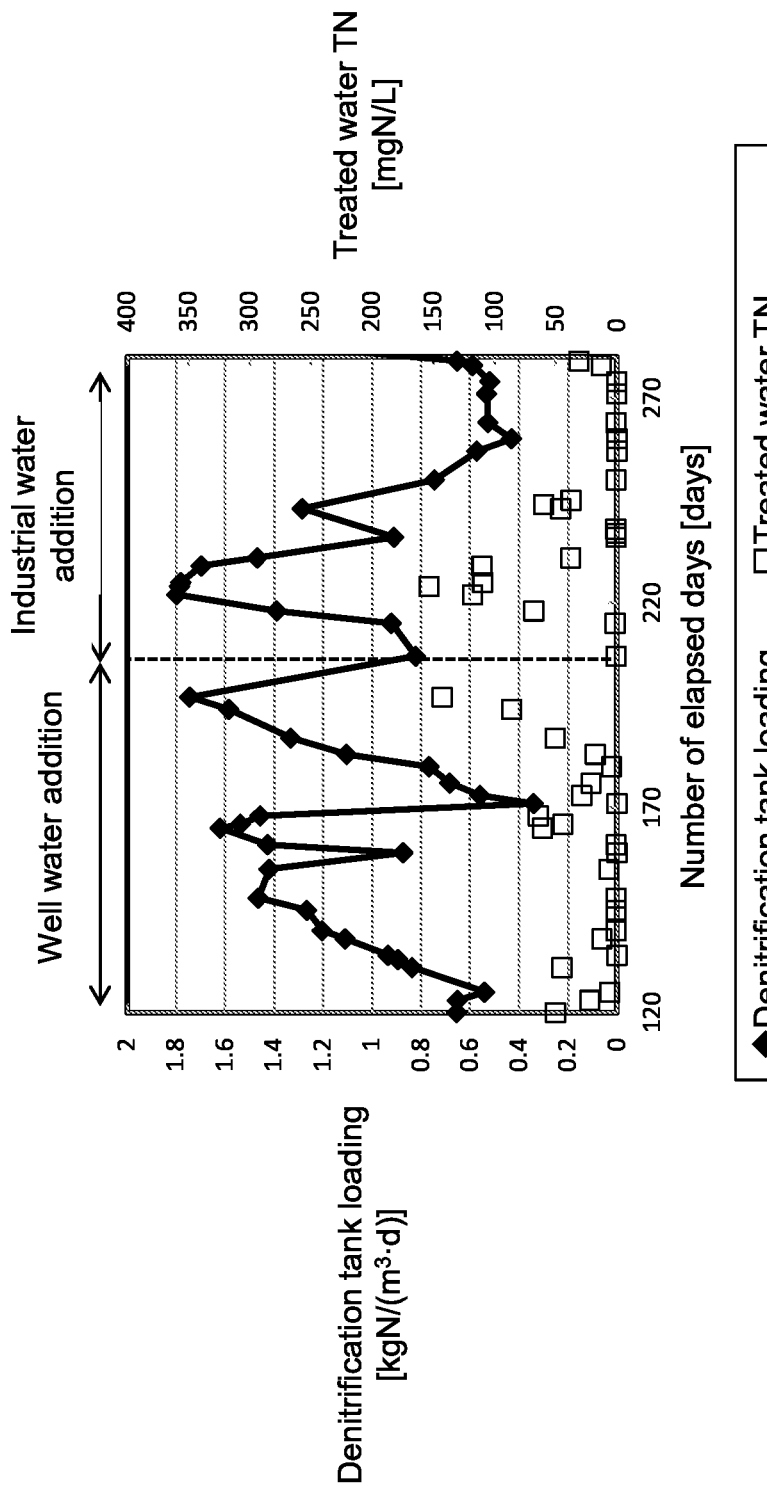
FIG. 12 is a graph illustrating the denitrification tank volumetric loading [kgN/(m$^3$·d)] and the treated water total nitrogen concentration [mgN/L] relative to the number of elapsed days [day] in Comparative Example 2.

The changes in the nitrification tank volumetric loading [kgN/(m$^3$·d)] and the nitrification tank residual ammonium nitrogen concentration [mgN/L] are illustrated in FIG. 11, and the changes in the denitrification tank volumetric loading [kgN/(m$^3$·d)] and the treated water total nitrogen concentration [mgN/L] are illustrated in FIG. 12. As is evident from FIG. 11, the nitrification tank volumetric loading was able to be increased to 0.8 kgN/(m$^3$·d), but on day 169, the residual ammonium nitrogen concentration was 41 mgN/L, and by day 171, this had increased to 130 mgN/L. Even after that time, the nitrification performance was unstable, with between 10 and 40 mgN/L of ammonium nitrogen remaining in the nitrification tank, meaning stable operation was impossible. Further, the nitrification activity during the test period was from 0.02 to 0.075 kgN/(kgVSS·d). Due to the instability in the nitrification, the denitrification treatment was also unstable, and the treated water TN reached a maximum of about 150 mgN/L.

Example 2

Using a simulated water and tester under the same conditions as Comparative Example 2, the effect of addition of a molybdenum compound solution was investigated in a continuous water flow test. The molybdenum concentration was set to 0.02 mgMo/L relative to an ammonium nitrogen concentration in the water to be treated of 800 mgN/L, and addition of the molybdenum was started on day 175. The concentration of the added molybdenum relative to the nitrogen concentration in the water to be treated represented a condition of 0.025 mgMo/gN.

Figure 13:
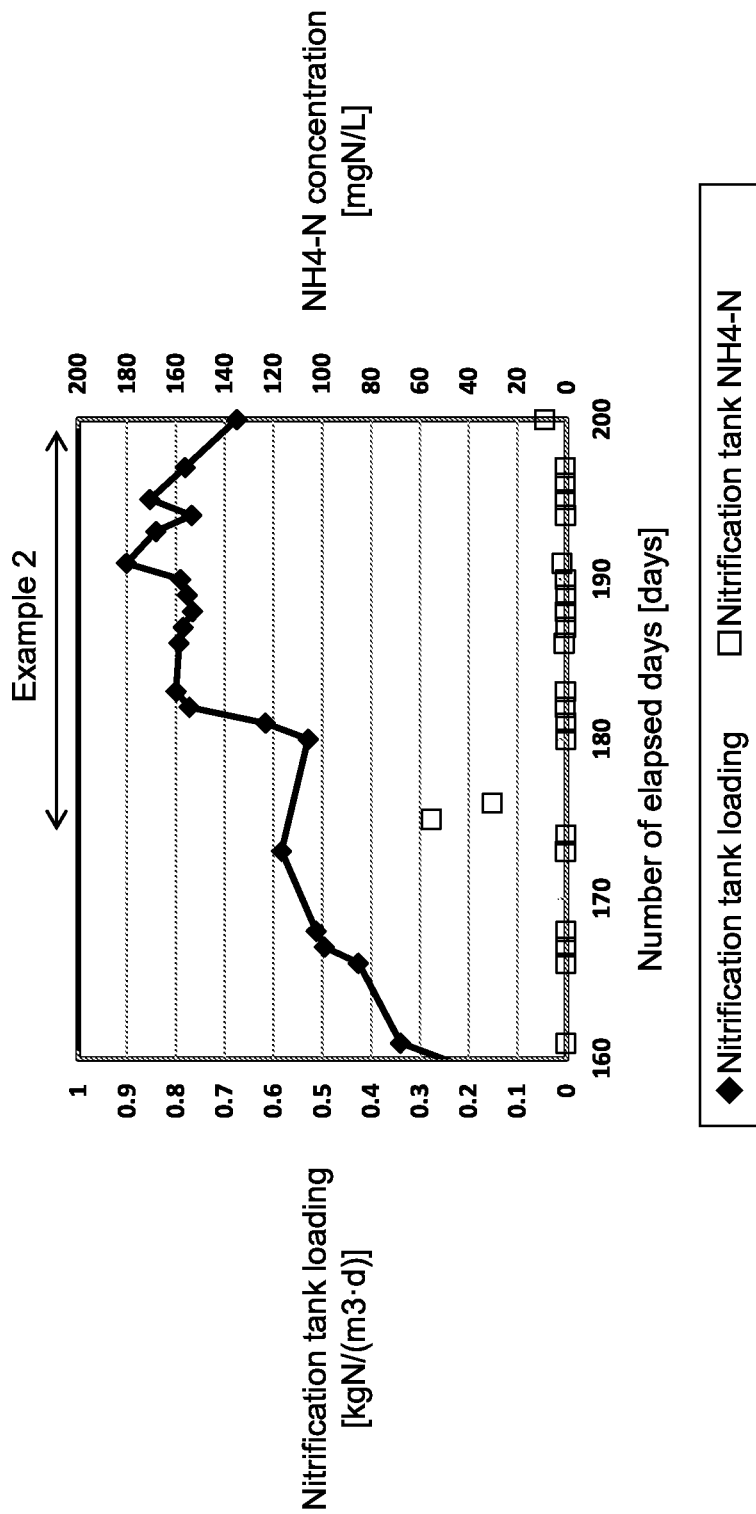
FIG. 13 is a graph illustrating the nitrification tank volumetric loading [kgN/(m$^3$·d)] and the nitrification tank ammonium nitrogen concentration [mgN/L] relative to the number of elapsed days [day] in Example 2.
Figure 14:
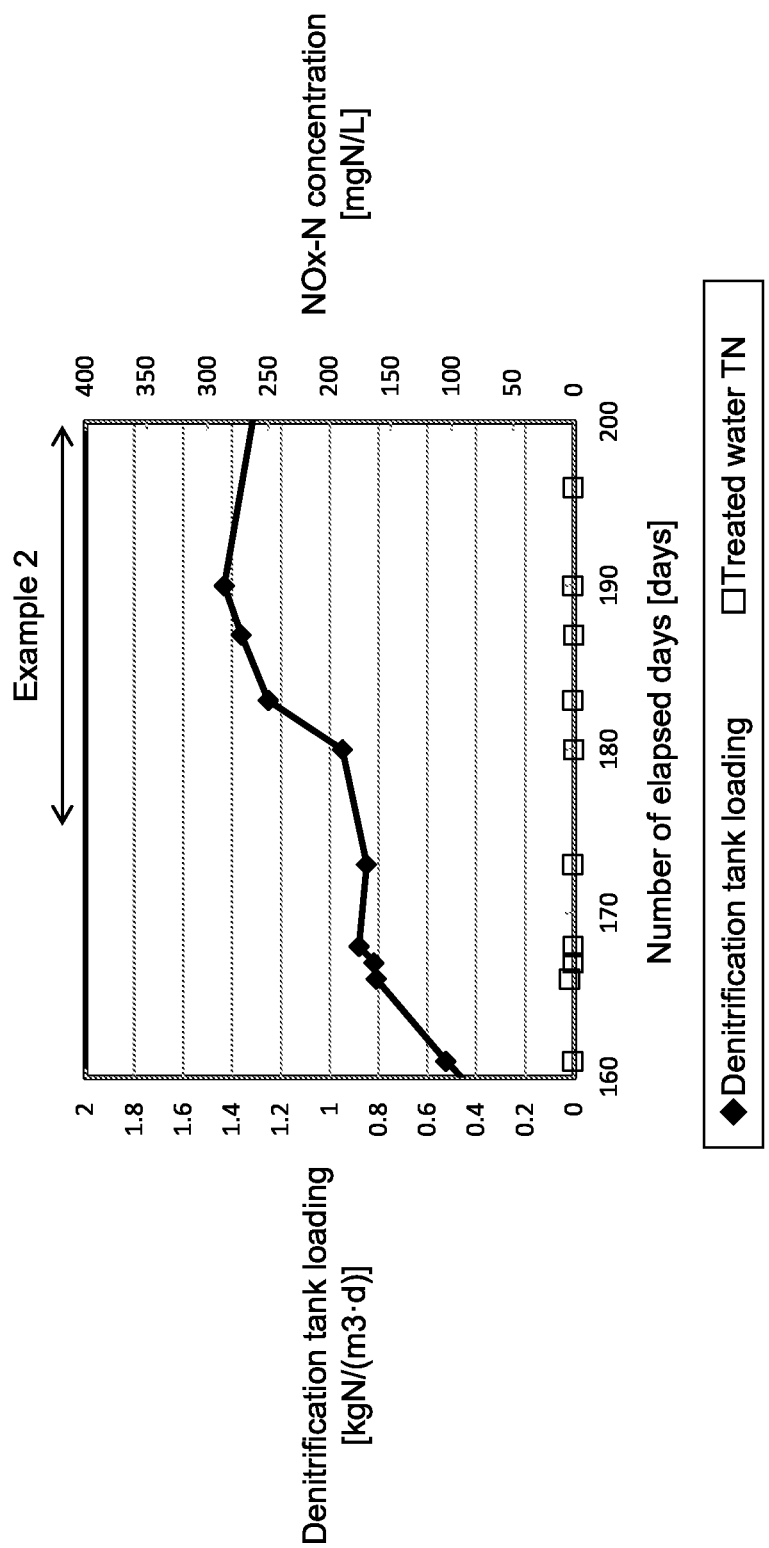
FIG. 14 is a graph illustrating the denitrification tank volumetric loading [kgN/(m³·d)] and the treated water total nitrogen concentration [mgN/L] relative to the number of elapsed days [day] in Example 2.

The changes in the nitrification tank volumetric loading [kgN/(m$^3$·d)] and the nitrification tank residual ammonium nitrogen concentration [mgN/L] are illustrated in FIG. 13, and the changes in the denitrification tank volumetric loading [kgN/(m$^3$·d)] and the treated water total nitrogen concentration [mgN/L] are illustrated in FIG. 14. The results revealed that in the period where molybdenum was not added, the nitrification tank volumetric loading could not be increased, and by day 175, 55 mgN/L of ammonium nitrogen remained in the nitrification tank. When addition of the Mo compound was started on day 175, a decrease in the ammonium nitrogen concentration was confirmed, and stable operation was possible even when the volumetric loading was increased to 0.8 to 0.9 kgN/(m$^3$·d). The maximum nitrification activity prior to the molybdenum addition was 0.05 kgN/(kgVSS·d), whereas the nitrification activity after starting molybdenum addition increased to 0.11 kgN/(kgVSS·d). In terms of the denitrification, the denitrification tank volumetric loading increased to 1.4 kgN/(m$^3$·d).

Example 3

Using a simulated water and tester under the same conditions as Example 2, the effect of addition of a molybdenum compound was investigated in a continuous water flow test. The added molybdenum concentration was set to 0.1 mgMo/L relative to an ammonium nitrogen concentration in the water to be treated of 800 mgN/L, and addition of the molybdenum was started on day 343. The concentration of the added molybdenum relative to the nitrogen concentration in the water to be treated represented a condition of 0.125 mgMo/gN.

Figure 15:
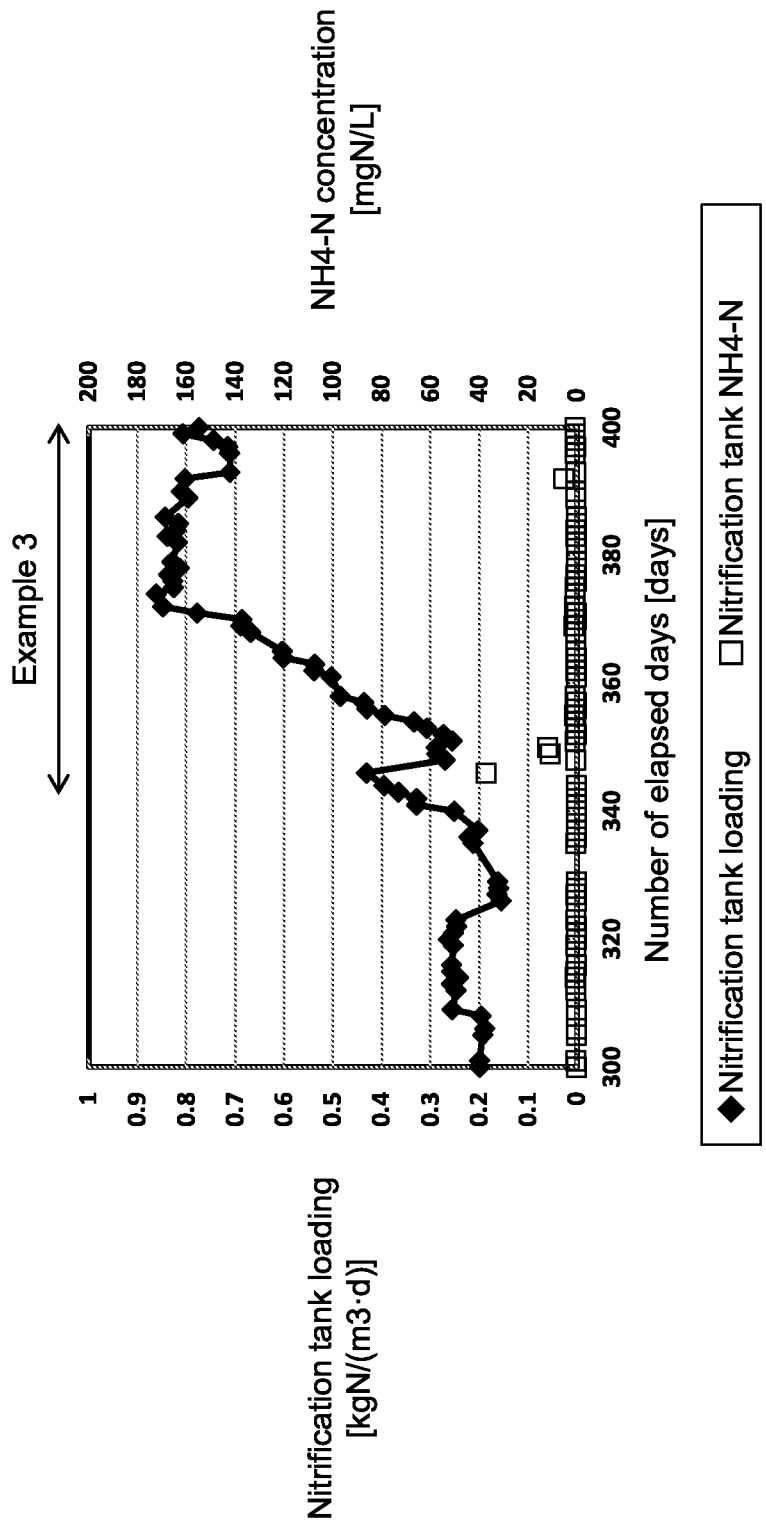
FIG. 15 is a graph illustrating the nitrification tank volumetric loading [kgN/(m³·d)] and the nitrification tank ammonium nitrogen concentration [mgN/L] relative to the number of elapsed days [day] in Example 3.
Figure 16:
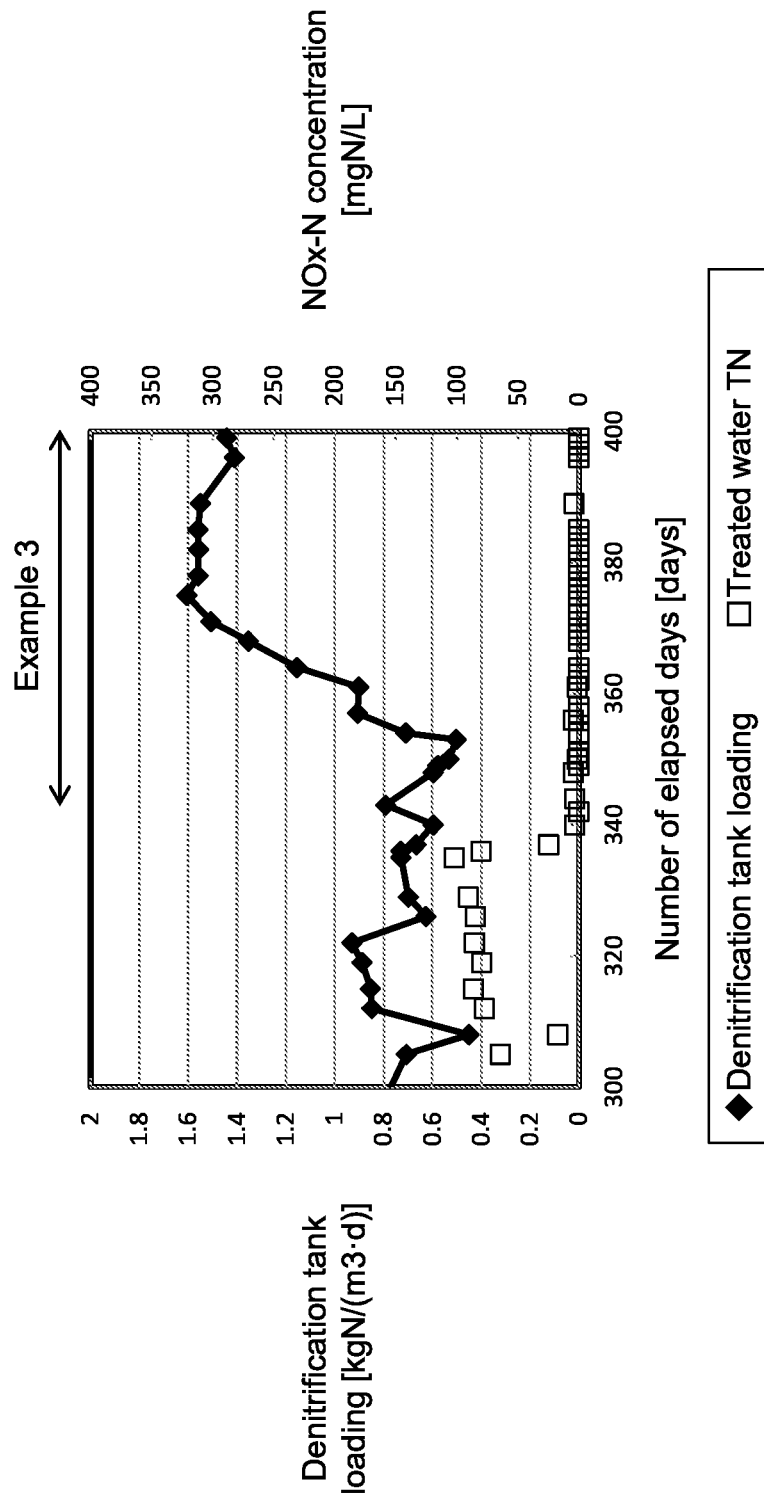
FIG. 16 is a graph illustrating the denitrification tank volumetric loading [kgN/(m³·d)] and the treated water total nitrogen concentration [mgN/L] relative to the number of elapsed days [day] in Example 3.

The changes in the nitrification tank volumetric loading [kgN/(m$^3$·d)] and the nitrification tank residual ammonium nitrogen concentration [mgN/L] are illustrated in FIG. 15, and the changes in the denitrification tank volumetric loading [kgN/(m$^3$·d)] and the treated water total nitrogen concentration [mgN/L] are illustrated in FIG. 16. The results revealed that in the period where molybdenum was not added, because from about 70 to 80 mg/L of nitrate nitrogen was detected in the denitrification tank, the loading could not be increased, with the nitrification tank volumetric loading stagnating at about 0.25 kgN/(m$^3$·d). Addition of the molybdenum solution was started on day 343, and increased loading was tested. On day 346, the ammonium nitrogen concentration detected in the nitrification tank was 37 mgN/L, but after that, a decrease in the ammonium nitrogen concentration was observed. The nitrification tank volumetric loading was increased to 0.86 kgN/(m$^3$·d), but no ammonium nitrogen was detected in the nitrification tank, and the treated water TN in the denitrification tank fell to 5 mgN or less. The nitrification activity prior to the molybdenum addition stagnated at 0.05 to 0.06 kgN/(kgVSS·d), but after starting the molybdenum addition, an increase in the activity was observed, and an increase to 0.2 kgN/(kgVSS·d) was confirmed.

Figure 17:
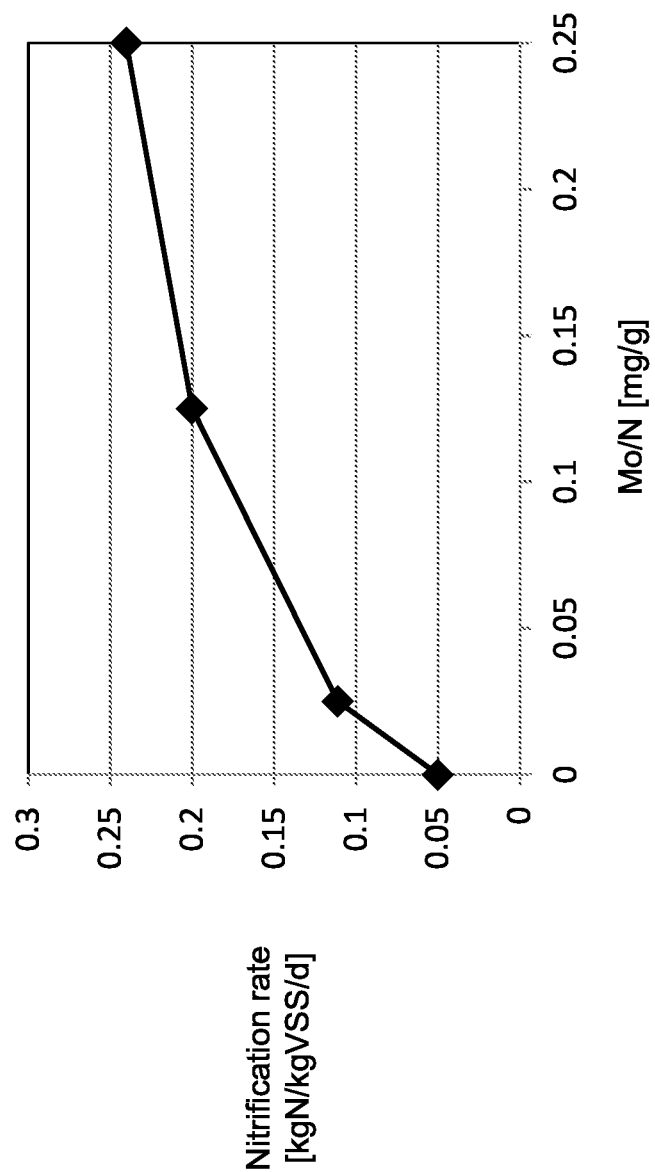
FIG. 17 is a graph illustrating the nitrification rate [kgN/(kgVSS·d)] relative to the molybdenum concentration (Mo/N [mg/g]) in the examples.

A summary of the above results is shown in FIG. 17. Based on FIG. 17, it is evident that, in the nitrification step, a molybdenum compound may be allowed to be present in the water to be treated in an amount sufficient to obtain a molybdenum concentration of equal to or more than 0.025 mgMo/L.

In this manner, by using the method described in the examples in the biological treatment of a water to be treated containing ammonium nitrogen, treatment was able to be performed stably at a high treatment rate even when the nitrogen concentration in the water to be treated was high.

An evaluation of the inhibitory effects of the concentration of added molybdenum compound on the ammonia oxidation reaction and the denitrification reaction was conducted using a batch test described below.

[Test of Effect of Molybdenum Addition on Denitrification (Batch Test)]

Using a nitrification-denitrification sludge, the effect of molybdenum addition on the denitrification reaction was investigated by a batch test using a simulated wastewater. The specific method used for the test method is described below.

1. For the simulated water used in the batch test, a water prepared by adding 60 mgN/L of nitrate ions and 1 mgP/L of phosphate phosphorus to well water was used. The molybdenum concentration in this simulated wastewater was 0.0001 mg/L or less.

2. A sludge prepared by washing with pure water a sludge that had been acclimatized in advance with methanol as a hydrogen donor was suspended in the simulated wastewater and dispensed into five beakers.

3. A sodium molybdate solution was added and stirred into the mixed liquid containing the sludge and the simulated wastewater in each beaker so as to achieve molybdenum concentrations of 0 mgMo/L, 1 mgMo/L, 5 mgMo/L, 10 mgMo/L and 20 mgMo/L respectively.

4. With each beaker undergoing stirring, an equal amount of methanol was added as a hydrogen donor to each beaker, and the rate of decrease in the nitrate concentration was evaluated.

The results of the denitrification activity test revealed that the denitrification activity, calculated from the rate of nitrate decrease and the amount of sludge in the beaker, was 0.43 gN/gSS/day in the system to which Mo was not added, 0.46 gN/gSS/day in the system having a Mo concentration of 1 mgMo/L, 0.45 gN/gSS/day in the system having a Mo concentration of 5 mgMo/L, 0.42 gN/gSS/day in the system having a Mo concentration of 10 mgMo/L, and 0.41 gN/gSS/day in the system having a Mo concentration of 20 mgMo/L, confirming an improvement in activity, although small, compared with the system to which Mo was not added, of 8% in the system having a Mo concentration of 1 mgMo/L, and 5% in the system having a Mo concentration of 5 mgMo/L. On the other hand, even in the system having an added Mo concentration of 20 mgMo/L, the decrease in activity compared with the system having a Mo concentration of 1 mgMo/L which exhibited the highest denitrification activity was only about 10%, indicating that marked inhibition of the denitrification by Mo could not be confirmed.

[Test of Effect of Mo Addition on Ammonia Oxidation (Batch Test)]

Using a nitrification-denitrification sludge, the effect of molybdenum addition on the ammonia oxidation reaction was investigated by a batch test using a simulated wastewater. The specific method used for the test method is described below.

1. For the simulated water used in the batch test, a water prepared by adding 60 mgN/L of ammonium ions and 1 mgP/L of phosphate phosphorus to well water was used. The molybdenum concentration in this simulated wastewater was 0.0001 mg/L or less.
2. The test sludge was washed with pure water and suspended in the simulated wastewater, and the resulting mixture was dispensed into five beakers.
3. A sodium molybdate solution was added to the mixed liquid containing the sludge and the simulated wastewater in each beaker so as to achieve molybdenum concentrations of 0 mgMo/L, 0.1 mgMo/L, 0.5 mgMo/L, 2 mgMo/L and 10 mgMo/L respectively, and aeration of each beaker was started.
4. The rate of decrease in the ammonium nitrogen concentration in each beaker was evaluated.

The results of the ammonia oxidation activity test revealed that the ammonia oxidation activity, calculated from the rate of decrease of ammonia and the amount of sludge in the beaker, was 0.18 gN/gSS/day in the system to which Mo was not added, 0.13 gN/gSS/day in the system having a Mo concentration of 0.1 mgMo/L, 0.13 gN/gSS/day in the system having a Mo concentration of 0.5 mgMo/L, 0.13 gN/gSS/day in the system having a Mo concentration of 2 mgMo/L, and 0.10 gN/gSS/day in the system having a Mo concentration of 10 mgMo/L, confirming that the ammonia oxidation activity was highest in the system to which Mo was not added, and lowest in the system having a Mo concentration of 10 mgMo/L. Based on the results of these batch tests, it is thought that in order to suppress any inhibition on the ammonia oxidation reaction by molybdenum, the molybdenum concentration may be limited to not more than 2 mgMo/L.

REFERENCE SIGNS LIST 1, 2, 3, 4, 5, 6, 7, 9: Water treatment device
10: Nitrification device
12: Denitrification device
14: Solid-liquid separation device
15: Water to be treated balancing tank
16, 18, 20, 22, 32, 34, 36, 38, 40, 42, 50, 52, 54, 62, 64, 66, 80, 82: Line
17: Water to be treated supply pump
19: Flow rate measurement device
21: Molybdenum compound supply pump
23: Hydrogen donor supply pump
24, 44: Sludge return line
25: Sludge return pump
26: Molybdenum compound supply line
28: Hydrogen donor supply line
30: Oxidation device
46: Nitrified liquid return line
48: Latter-stage denitrification device
58: First denitrification device
60: Second denitrification device
63, 65: Ammonium nitrogen concentration measurement device
67: Treated water tank
68, 70, 76: Carrier
72, 74, 78: Screen

The invention claimed is:

1. A water treatment method for biologically treating a water to be treated containing ammonium nitrogen, the method comprises:
    nitrifying that oxidizes the ammonium nitrogen to obtain nitrite or nitrate nitrogen using nitrifying bacteria that include autotrophic ammonia-oxidizing bacteria and nitrite-oxidizing bacteria contained in a microbial activated sludge,
    in the nitrifying, a molybdenum compound is allowed to be present in the water to be treated so as to obtain a molybdenum concentration of equal to or more than 0.025 mgMo/gN, and
    wherein a sludge nitrification rate is equal to or more than 0.11 [kgN/(kgVSS·day)].

2. The water treatment method as claimed in claim 1, wherein
    a molybdenum concentration in the nitrifying is not more than 2 mgMo/L relative to the water to be treated.

3. The water treatment method as claimed in claim 1, wherein
    a nitrogen concentration in the water to be treated is equal to or more than 100 mgN/L.

4. The water treatment method as claimed in claim 1,
    further comprising denitrifying that reduces the nitrite or nitrate nitrogen produced in the nitrifying to obtain nitrogen gas using denitrifying bacteria contained in the microbial activated sludge.

5. The water treatment method as claimed in claim 4, wherein
    in the denitrifying, the microbial activated sludge containing the nitrifying bacteria and denitrifying bacteria is granulated by imparting time variation to an amount added of a hydrogen donor so that a difference between a maximum concentration and a minimum concentration of the hydrogen donor in a hydraulic retention time for the treated water is equal to or more than 50 mgTOC/L.

6. The water treatment method as claimed in claim 5, wherein
    the denitrifying comprises at least a first denitrifying and a second denitrifying, and
    in the denitrifying, a hydrogen donor is supplied at least in the first denitrifying such that a difference between a maximum concentration of the hydrogen donor in the first denitrifying and a minimum concentration of the hydrogen donor in the second denitrifying in a hydraulic retention time for the treated water in the second denitrifying is equal to or more than 50 mgTOC/L.

7. A water treatment device for biologically treating a water to be treated containing ammonium nitrogen, wherein the water treatment device comprises:
    a nitrification unit which oxidizes the ammonium nitrogen to obtain nitrite or nitrate nitrogen using nitrifying bacteria that include autotrophic ammonia-oxidizing bacteria and nitrite-oxidizing bacteria contained in a microbial activated sludge;
    a nitrification rate controller which, in the nitrification unit, a molybdenum compound is allowed to be present in the water to be treated so as to obtain a molybdenum concentration of equal to or more than 0.025 mgMo/gN, and also controls a sludge nitrification rate to a value of equal to or more than 0.11 [kgN/(kgVSS·day)];
    wherein a nitrogen concentration in the water to be treated is equal to or more than 100 mgN/L, and a denitrification unit which reduces the nitrite or nitrate nitrogen produced in the nitrification unit to obtain nitrogen gas using denitrifying bacteria contained in the microbial activated sludge, said denitrification unit comprises a hydrogen donor concentration controller which controls granulation of the microbial activated sludge containing the nitrifying bacteria and denitrifying bacteria by imparting time variation to an amount added of a hydrogen donor so that a difference between a maximum concentration and a minimum concentration of the hydrogen donor in a hydraulic retention time for the treated water is equal to or more than 50 mgTOC/L.

8. The water treatment device as claimed in claim 7, wherein
the nitrification rate controller which controls the molybdenum concentration in the nitrification unit to a value of not more than 2 mgMo/L relative to the water to be treated.

9. The water treatment device as claimed in claim 7, wherein
a molybdenum concentration in the water to be treated is not more than 0.0001 mgMo/L.

10. The water treatment device as claimed in claim 7, wherein
the denitrification unit comprises at least a first denitrification unit and a second denitrification unit, and
in the denitrification unit, the hydrogen donor concentration controller which controls supply of the hydrogen donor in at least the first denitrification unit such that a difference between a maximum concentration of the hydrogen donor in the first denitrification unit and a minimum concentration of the hydrogen donor in the second denitrification unit in a hydraulic retention time for the treated water in the second denitrification unit is equal to or more than 50 mgTOC/L.

11. A water treatment device for biologically treating a water to be treated containing ammonium nitrogen, wherein the water treatment device comprises:
a nitrification unit which aerobically oxidizes the ammonium nitrogen to obtain nitrite or nitrate nitrogen using nitrifying bacteria that include autotrophic ammonia-oxidizing bacteria and nitrite-oxidizing bacteria contained in a microbial activated sludge, and
the nitrification unit comprises:
a first portion which supplies an oxygen-containing gas;
a second portion which adjusts a flow rate of the water to be treated such that a sludge nitrification rate is equal to or more than 0.11 [kgN/(kgVSS·day)]; and
a third portion which supplies a molybdenum compound into the water to be treated so as to obtain a molybdenum concentration of equal to or more than 0.025 mgMO/gN.

12. The water treatment device as claimed in claim 11, wherein
a nitrification rate controller controls the molybdenum concentration in the nitrification unit to a value of not more than 2 mgMo/L relative to the water to be treated.

13. The water treatment device as claimed in claim 11, wherein
a molybdenum concentration in the water to be treated is not more than 0.0001 mgMo/L.

14. The water treatment device as claimed in claim 11, wherein
a nitrogen concentration in the water to be treated is equal to or more than 100 mgN/L.

15. The water treatment device as claimed in claim 14, further comprising a denitrification unit which reduces the nitrite or nitrate nitrogen produced in the nitrification unit to obtain nitrogen gas using denitrifying bacteria contained in the microbial activated sludge.

16. The water treatment device as claimed in claim 15, wherein
the denitrification unit further comprises a hydrogen donor concentration controller which controls granulation of the microbial activated sludge containing the nitrifying bacteria and denitrifying bacteria by imparting time variation to an amount added of a hydrogen donor so that a difference between a maximum concentration and a minimum concentration of the hydrogen donor in a hydraulic retention time for the treated water is equal to or more than 50 mgTOC/L.

17. The water treatment device as claimed in claim 16, wherein
the denitrification unit comprises at least a first denitrification unit and a second denitrification unit, and
in the denitrification unit, the hydrogen donor concentration controller which controls supply of the hydrogen donor in at least the first denitrification unit such that a difference between a maximum concentration of the hydrogen donor in the first denitrification unit and a minimum concentration of the hydrogen donor in the second denitrification unit in a hydraulic retention time for the treated water in the second denitrification unit is equal to or more than 50 mgTOC/L.

* * * * *